(12) United States Patent
Bita et al.

(10) Patent No.: US 8,061,882 B2
(45) Date of Patent: Nov. 22, 2011

(54) ILLUMINATION DEVICE WITH BUILT-IN LIGHT COUPLER

(75) Inventors: Ion Bita, San Jose, CA (US); Marek Mienko, San Jose, CA (US); Gang Xu, Cupertino, CA (US); Russell W. Gruhlke, Milpitas, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 12/416,886

(22) Filed: Apr. 1, 2009

(65) Prior Publication Data

US 2009/0190373 A1 Jul. 30, 2009

Related U.S. Application Data

(63) Continuation of application No. PCT/US2007/021376, filed on Oct. 5, 2007.

(60) Provisional application No. 60/850,189, filed on Oct. 6, 2006.

(51) Int. Cl.
*F21V 7/04* (2006.01)
(52) U.S. Cl. .......................... 362/623; 362/612; 362/615
(58) Field of Classification Search .................. 362/600, 362/606, 610, 612, 613, 621, 623, 615
See application file for complete search history.

(56) References Cited

U.S. PATENT DOCUMENTS

| | | | |
|---|---|---|---|
| 3,448,334 A | 6/1969 | Frost | |
| 3,924,929 A | 12/1975 | Holmen | |
| 4,287,449 A | 9/1981 | Takeda et al. | |
| 4,378,567 A | 3/1983 | Mir | |
| 4,441,791 A | 4/1984 | Hornbeck | |
| 4,832,459 A | 5/1989 | Harper | |
| 4,850,682 A | 7/1989 | Gerritsen | |
| 4,863,224 A | 9/1989 | Afian | |
| 4,915,479 A | 4/1990 | Clarke | |
| 4,918,577 A * | 4/1990 | Furudate | 362/615 |
| 4,947,291 A | 8/1990 | McDermott | |

(Continued)

FOREIGN PATENT DOCUMENTS

CA 2 490 975 1/2004

(Continued)

OTHER PUBLICATIONS

Neal, et al., "Surface plasmon enhanced emission from dye doped polymer layers", Optics Express, vol. 13, No. 14, 5552-7 (Jul. 11, 2005).

(Continued)

*Primary Examiner* — John A Ward
(74) *Attorney, Agent, or Firm* — Knobbe, Martens, Olson & Bear, LLP

(57) ABSTRACT

The invention comprises devices and methods for coupling a light source to a display illumination device. In one embodiment, an illumination device includes a light guide comprising a front surface, a back surface, a light coupling section configured to receive optical energy from a light source in to the light guide through said front surface or said back surface at an angle about normal to the optical energy receiving surface, and further configured to direct light through said light guide, and a light turning section configured to redirect out of the light guide at least a portion of the light received from said light coupling section, said redirected light at an angle about normal to the optical energy receiving surface.

48 Claims, 16 Drawing Sheets

U.S. PATENT DOCUMENTS

| | | |
|---|---|---|
| 4,961,617 A | 10/1990 | Shahidi |
| 4,985,312 A | 1/1991 | Furuya et al. |
| 5,151,585 A | 9/1992 | Seibert |
| 5,161,041 A | 11/1992 | Abileah et al. |
| 5,206,747 A | 4/1993 | Wiley et al. |
| 5,226,099 A | 7/1993 | Mignardi et al. |
| 5,283,674 A | 2/1994 | Hanaoka et al. |
| 5,339,179 A | 8/1994 | Rudisill |
| 5,341,242 A | 8/1994 | Gilboa et al. |
| 5,361,190 A | 11/1994 | Roberts et al. |
| 5,398,125 A | 3/1995 | Willett |
| 5,448,659 A | 9/1995 | Tsutsui et al. |
| 5,452,385 A | 9/1995 | Izumi et al. |
| 5,459,610 A | 10/1995 | Bloom et al. |
| 5,467,417 A | 11/1995 | Nakamura |
| 5,481,385 A | 1/1996 | Zimmerman et al. |
| 5,497,293 A | 3/1996 | Noguchi et al. |
| 5,515,184 A | 5/1996 | Caulfield |
| 5,594,830 A | 1/1997 | Winston |
| 5,633,739 A | 5/1997 | Matsuyama |
| 5,647,036 A | 7/1997 | Deacon |
| 5,650,865 A | 7/1997 | Smith |
| 5,659,410 A | 8/1997 | Koike |
| 5,664,862 A | 9/1997 | Redmond et al. |
| 5,671,314 A | 9/1997 | Gregory et al. |
| 5,671,994 A | 9/1997 | Tai |
| 5,673,128 A | 9/1997 | Ohta et al. |
| 5,703,667 A | 12/1997 | Ochiai |
| 5,712,694 A | 1/1998 | Taira et al. |
| 5,735,590 A | 4/1998 | Kashima |
| 5,751,492 A | 5/1998 | Meyers |
| 5,754,260 A | 5/1998 | Ooi |
| 5,764,315 A | 6/1998 | Yokota et al. |
| 5,771,124 A | 6/1998 | Kintz |
| 5,771,321 A | 6/1998 | Stern |
| 5,782,993 A | 7/1998 | Ponewash |
| 5,805,117 A | 9/1998 | Mazurek |
| 5,808,708 A | 9/1998 | Oyama et al. |
| 5,810,464 A | 9/1998 | Ishikawa |
| 5,815,229 A | 9/1998 | Shapiro |
| 5,835,255 A | 11/1998 | Miles |
| 5,845,035 A | 12/1998 | Wimberger-Friedl |
| 5,854,872 A | 12/1998 | Tai |
| 5,892,598 A | 4/1999 | Asakawa et al. |
| 5,913,594 A | 6/1999 | Iimura |
| 5,914,804 A | 6/1999 | Goossen |
| 5,933,183 A | 8/1999 | Enomoto |
| 5,956,106 A | 9/1999 | Petersen |
| 5,982,540 A | 11/1999 | Koike |
| 5,986,796 A | 11/1999 | Miles |
| 5,991,073 A | 11/1999 | Woodgate et al. |
| 5,999,239 A | 12/1999 | Larson |
| 6,002,829 A | 12/1999 | Winston |
| 6,014,192 A | 1/2000 | Lehureau |
| 6,023,373 A | 2/2000 | Inoguchi et al. |
| 6,031,653 A | 2/2000 | Wang |
| 6,040,937 A | 3/2000 | Miles |
| 6,048,071 A | 4/2000 | Sawayama |
| 6,055,090 A | 4/2000 | Miles |
| 6,068,382 A | 5/2000 | Fukui |
| 6,072,620 A | 6/2000 | Shiono |
| 6,073,034 A | 6/2000 | Jacobsen |
| 6,074,069 A | 6/2000 | Chao-Ching |
| 6,088,102 A | 7/2000 | Manhart |
| 6,099,134 A | 8/2000 | Taniguchi |
| 6,104,454 A | 8/2000 | Hiyama et al. |
| 6,128,077 A | 10/2000 | Jovin |
| 6,151,089 A | 11/2000 | Yang et al. |
| 6,195,196 B1 | 2/2001 | Kimura |
| 6,196,691 B1 | 3/2001 | Ochiai |
| 6,232,937 B1 | 5/2001 | Jacobsen |
| 6,243,149 B1 | 6/2001 | Swanson et al. |
| 6,259,082 B1 * | 7/2001 | Fujimoto et al. ........... 250/208.1 |
| 6,273,577 B1 | 8/2001 | Goto |
| 6,282,010 B1 | 8/2001 | Sulzbach |
| 6,283,602 B1 | 9/2001 | Kawaguchi et al. |
| 6,301,000 B1 | 10/2001 | Johnson |
| 6,322,901 B1 | 11/2001 | Bawendi |
| 6,323,834 B1 | 11/2001 | Colgan |
| 6,323,892 B1 | 11/2001 | Mihara |
| 6,323,987 B1 | 11/2001 | Rinaudo |
| 6,356,378 B1 | 3/2002 | Huibers |
| 6,371,623 B1 | 4/2002 | Toyoda |
| 6,377,535 B1 | 4/2002 | Chen et al. |
| 6,381,022 B1 | 4/2002 | Zavracky |
| 6,402,325 B1 | 6/2002 | Yamamoto |
| 6,407,785 B1 | 6/2002 | Yamazaki |
| 6,411,423 B2 | 6/2002 | Ham |
| 6,412,969 B1 | 7/2002 | Torihara et al. |
| 6,421,103 B2 | 7/2002 | Yamaguchi |
| 6,431,716 B1 | 8/2002 | Kusakabe |
| 6,442,124 B1 | 8/2002 | Chung et al. |
| 6,454,452 B1 | 9/2002 | Sasagawa |
| 6,478,432 B1 | 11/2002 | Dyner |
| 6,480,634 B1 | 11/2002 | Corrigan |
| 6,483,613 B1 | 11/2002 | Woodgate et al. |
| 6,493,475 B1 | 12/2002 | Lin |
| 6,494,588 B1 | 12/2002 | Okada |
| 6,504,589 B1 | 1/2003 | Kashima |
| 6,522,373 B1 | 2/2003 | Hira et al. |
| 6,522,794 B1 | 2/2003 | Bischel |
| 6,527,410 B2 | 3/2003 | Yamaguchi |
| 6,538,813 B1 | 3/2003 | Magno |
| 6,540,368 B2 | 4/2003 | Akaoka |
| 6,561,661 B2 | 5/2003 | Egawa |
| 6,565,225 B2 | 5/2003 | Mabuchi et al. |
| 6,574,033 B1 | 6/2003 | Chui |
| 6,577,429 B1 | 6/2003 | Kurtz |
| 6,582,095 B1 | 6/2003 | Toyoda |
| 6,592,234 B2 | 7/2003 | Epstein |
| 6,597,490 B2 | 7/2003 | Tayebati |
| 6,598,987 B1 | 7/2003 | Parikka |
| 6,603,520 B2 | 8/2003 | Umemoto |
| 6,624,944 B1 | 9/2003 | Wallace et al. |
| 6,630,968 B1 | 10/2003 | Tsuchihashi et al. |
| 6,631,998 B2 | 10/2003 | Egawa et al. |
| 6,636,322 B1 | 10/2003 | Terashita |
| 6,636,358 B2 | 10/2003 | Umemoto et al. |
| 6,642,913 B1 | 11/2003 | Kimura et al. |
| 6,646,772 B1 | 11/2003 | Popovich et al. |
| 6,650,455 B2 | 11/2003 | Miles |
| 6,652,109 B2 | 11/2003 | Nakamura |
| 6,659,615 B2 | 12/2003 | Umemoto |
| 6,660,997 B2 | 12/2003 | Laberge |
| 6,669,350 B2 | 12/2003 | Yamashita |
| 6,674,562 B1 | 1/2004 | Miles |
| 6,680,792 B2 | 1/2004 | Miles |
| 6,693,690 B2 | 2/2004 | Umemoto |
| 6,697,403 B2 | 2/2004 | Lee et al. |
| 6,706,339 B1 | 3/2004 | Miyatake et al. |
| 6,738,194 B1 | 5/2004 | Ramirez |
| 6,742,907 B2 | 6/2004 | Funamoto et al. |
| 6,751,023 B2 | 6/2004 | Umemoto et al. |
| 6,760,135 B1 | 7/2004 | Payne |
| 6,760,146 B2 | 7/2004 | Ikeda et al. |
| 6,761,461 B2 | 7/2004 | Mizutani et al. |
| 6,768,555 B2 | 7/2004 | Chen et al. |
| 6,773,126 B1 | 8/2004 | Hatjasalo |
| 6,784,948 B2 | 8/2004 | Kawashima et al. |
| 6,798,469 B2 | 9/2004 | Kimura |
| 6,819,380 B2 | 11/2004 | Wen et al. |
| 6,822,628 B2 | 11/2004 | Dunphy et al. |
| 6,822,745 B2 | 11/2004 | De Groot et al. |
| 6,822,780 B1 | 11/2004 | Long |
| 6,826,000 B2 | 11/2004 | Lee et al. |
| 6,841,787 B2 | 1/2005 | Almogy |
| 6,853,129 B1 | 2/2005 | Cummings et al. |
| 6,862,141 B2 | 3/2005 | Olczak |
| 6,863,428 B2 | 3/2005 | Lundin |
| 6,865,312 B2 | 3/2005 | Niv et al. |
| 6,871,982 B2 | 3/2005 | Holman et al. |
| 6,879,354 B1 | 4/2005 | Sawayama |
| 6,883,924 B2 | 4/2005 | Maeda et al. |
| 6,883,934 B2 | 4/2005 | Kawakami |
| 6,885,377 B2 | 4/2005 | Lim |
| 6,897,855 B1 | 5/2005 | Matthies |
| 6,917,469 B2 | 7/2005 | Momose |

| Patent No. | Date | Name | | Patent No. | Date | Name |
|---|---|---|---|---|---|---|
| 6,930,816 B2 | 8/2005 | Mochizuki | | 7,643,203 B2 | 1/2010 | Gousev et al. |
| 6,940,653 B2 | 9/2005 | Favalora et al. | | 7,663,714 B2 | 2/2010 | Haga et al. |
| 6,951,401 B2 | 10/2005 | Van Hees et al. | | 7,688,494 B2 | 3/2010 | Xu et al. |
| 6,960,010 B2 | 11/2005 | Matsumoto et al. | | 7,706,050 B2 | 4/2010 | Sampsell |
| 6,961,045 B2 | 11/2005 | Tsao | | 7,710,632 B2 | 5/2010 | Cummings |
| 6,964,484 B2 | 11/2005 | Gupta | | 7,733,439 B2 | 6/2010 | Sampsell |
| 6,967,779 B2 | 11/2005 | Fadel et al. | | 7,750,886 B2 | 7/2010 | Sampsell |
| 6,998,196 B2 | 2/2006 | Rich et al. | | 7,758,227 B1 | 7/2010 | Coleman |
| 6,999,235 B2 | 2/2006 | Nakamura | | 7,766,498 B2 | 8/2010 | Sampsell |
| 7,001,060 B1 | 2/2006 | Kimura | | 7,777,954 B2 | 8/2010 | Gruhlke |
| 7,002,726 B2 | 2/2006 | Patel | | 7,807,488 B2 | 10/2010 | Gally |
| 7,009,754 B2 | 3/2006 | Huibers | | 7,813,026 B2 | 10/2010 | Sampsell |
| 7,012,659 B2 | 3/2006 | Smith et al. | | 7,813,029 B2 | 10/2010 | Kothari et al. |
| 7,014,349 B2 | 3/2006 | Shinohara et al. | | 7,843,061 B2 | 11/2010 | Poli et al. |
| 7,018,088 B2 | 3/2006 | Yu | | 7,845,841 B2 | 12/2010 | Sampsell |
| 7,019,734 B2 | 3/2006 | Cross et al. | | 7,855,827 B2 | 12/2010 | Xu et al. |
| 7,025,461 B2 | 4/2006 | Veligdan | | 7,876,489 B2 | 1/2011 | Gandhi et al. |
| 7,030,949 B2 | 4/2006 | Kashima | | 7,880,954 B2 | 2/2011 | Sampsell |
| 7,042,643 B2 | 5/2006 | Miles | | 7,907,319 B2 | 3/2011 | Miles |
| 7,046,409 B2 | 5/2006 | Kihara | | 7,911,428 B2 | 3/2011 | Gally |
| 7,048,426 B2 | 5/2006 | Kao et al. | | 7,929,196 B2 | 4/2011 | Gally et al. |
| 7,054,045 B2 | 5/2006 | McPheters | | 7,949,213 B2 | 5/2011 | Mienko et al. |
| 7,056,001 B2 * | 6/2006 | Chuang ............ 362/561 | | 2001/0003504 A1 * | 6/2001 | Ishihara et al. ............ 362/31 |
| 7,061,226 B2 | 6/2006 | Durr | | 2001/0010630 A1 | 8/2001 | Umemoto |
| 7,064,875 B2 | 6/2006 | Kawano | | 2001/0019240 A1 | 9/2001 | Takahashi |
| 7,068,948 B2 | 6/2006 | Wei et al. | | 2001/0019380 A1 * | 9/2001 | Ishihara ............ 349/65 |
| 7,072,093 B2 | 7/2006 | Piehl | | 2001/0019479 A1 | 9/2001 | Nakabayashi |
| 7,072,096 B2 | 7/2006 | Holman et al. | | 2001/0030861 A1 | 10/2001 | Oda |
| 7,110,158 B2 | 9/2006 | Miles | | 2001/0049061 A1 | 12/2001 | Nakagaki |
| 7,113,339 B2 | 9/2006 | Taguchi et al. | | 2002/0006036 A1 | 1/2002 | Egawa |
| 7,123,216 B1 | 10/2006 | Miles | | 2002/0018632 A1 | 2/2002 | Pelka |
| 7,126,738 B2 | 10/2006 | Miles | | 2002/0034071 A1 | 3/2002 | Mabuchi |
| 7,128,459 B2 | 10/2006 | Igarashi et al. | | 2002/0044445 A1 | 4/2002 | Bohler |
| 7,133,022 B2 | 11/2006 | Grabert | | 2002/0054258 A1 | 5/2002 | Kondo |
| 7,138,984 B1 | 11/2006 | Miles | | 2002/0060907 A1 | 5/2002 | Saccomanno |
| 7,142,347 B2 | 11/2006 | Islam | | 2002/0075245 A1 | 6/2002 | Kawashima |
| 7,161,136 B1 | 1/2007 | Wenstrand | | 2002/0075555 A1 | 6/2002 | Miles |
| 7,161,730 B2 | 1/2007 | Floyd | | 2002/0080465 A1 | 6/2002 | Han |
| 7,163,315 B2 | 1/2007 | Chang et al. | | 2002/0080597 A1 | 6/2002 | Coghlan |
| 7,180,672 B2 | 2/2007 | Olczak | | 2002/0080615 A1 | 6/2002 | Marshall et al. |
| 7,206,133 B2 | 4/2007 | Cassarly | | 2002/0105699 A1 | 8/2002 | Miracky |
| 7,210,806 B2 | 5/2007 | Holman | | 2002/0106182 A1 | 8/2002 | Kawashima |
| 7,212,345 B2 | 5/2007 | Wilson | | 2002/0135560 A1 | 9/2002 | Akaoka |
| 7,218,429 B2 | 5/2007 | Batchko | | 2002/0172039 A1 | 11/2002 | Inditsky |
| 7,221,418 B2 | 5/2007 | Lee | | 2002/0176035 A1 | 11/2002 | Yamazaki |
| 7,223,010 B2 | 5/2007 | Min | | 2003/0012009 A1 | 1/2003 | Suzuki |
| 7,262,754 B1 | 8/2007 | Yamazaki | | 2003/0016930 A1 | 1/2003 | Inditsky |
| 7,262,916 B2 | 8/2007 | Kao | | 2003/0030764 A1 | 2/2003 | Lee |
| 7,278,772 B2 | 10/2007 | Kunimochi | | 2003/0067760 A1 | 4/2003 | Jagt |
| 7,290,917 B2 | 11/2007 | Cho et al. | | 2003/0081154 A1 | 5/2003 | Coleman |
| 7,324,284 B2 | 1/2008 | Olczak | | 2003/0086031 A1 | 5/2003 | Taniguchi |
| 7,336,329 B2 | 2/2008 | Yoon | | 2003/0090887 A1 | 5/2003 | Igarashi |
| 7,342,705 B2 | 3/2008 | Chui et al. | | 2003/0095401 A1 | 5/2003 | Hanson |
| 7,342,709 B2 | 3/2008 | Lin | | 2003/0098957 A1 | 5/2003 | Haldiman |
| 7,346,251 B2 | 3/2008 | Bose | | 2003/0103177 A1 | 6/2003 | Maeda |
| 7,357,552 B2 | 4/2008 | Takada | | 2003/0103344 A1 | 6/2003 | Niida |
| 7,357,557 B2 | 4/2008 | Miyashita | | 2003/0107692 A1 | 6/2003 | Sekiguchi |
| 7,360,899 B2 | 4/2008 | McGuire | | 2003/0123245 A1 | 7/2003 | Parker |
| 7,366,393 B2 | 4/2008 | Cassarly | | 2003/0151821 A1 | 8/2003 | Favalora |
| 7,369,292 B2 | 5/2008 | Xu et al. | | 2003/0160919 A1 | 8/2003 | Suzuki |
| 7,374,327 B2 | 5/2008 | Schexnaider | | 2003/0161040 A1 | 8/2003 | Ishii |
| 7,375,779 B2 | 5/2008 | Lee et al. | | 2003/0165067 A1 | 9/2003 | Imamura |
| 7,376,308 B2 | 5/2008 | Cheben et al. | | 2003/0169385 A1 | 9/2003 | Okuwaki |
| 7,377,678 B2 | 5/2008 | Huang | | 2003/0184690 A1 | 10/2003 | Ogiwara |
| 7,380,970 B2 | 6/2008 | Hwang | | 2003/0193630 A1 | 10/2003 | Chiou |
| 7,388,181 B2 | 6/2008 | Han et al. | | 2003/0210222 A1 | 11/2003 | Ogiwara |
| 7,400,439 B2 | 7/2008 | Holman | | 2003/0210363 A1 | 11/2003 | Yasukawa |
| 7,403,180 B1 | 7/2008 | Silverstein et al. | | 2003/0210367 A1 | 11/2003 | Nakano |
| 7,417,784 B2 | 8/2008 | Sasagawa et al. | | 2003/0214621 A1 | 11/2003 | Kim |
| 7,456,805 B2 | 11/2008 | Ouderkirk | | 2003/0214728 A1 | 11/2003 | Olczak |
| 7,477,809 B1 | 1/2009 | Tan et al. | | 2003/0231483 A1 * | 12/2003 | Higashiyama ............ 362/31 |
| 7,508,571 B2 | 3/2009 | Gally | | 2004/0001169 A1 | 1/2004 | Saiki |
| 7,520,642 B2 | 4/2009 | Holman et al. | | 2004/0017599 A1 | 1/2004 | Yang |
| 7,545,569 B2 | 6/2009 | Cassarly | | 2004/0027315 A1 | 2/2004 | Senda et al. |
| 7,553,749 B2 | 6/2009 | Hu | | 2004/0032401 A1 | 2/2004 | Nakazawa |
| 7,561,133 B2 | 7/2009 | Mestha | | 2004/0032659 A1 | 2/2004 | Drinkwater |
| 7,561,323 B2 | 7/2009 | Gally | | 2004/0042233 A1 | 3/2004 | Suzuki |
| 7,564,612 B2 | 7/2009 | Chui | | 2004/0066477 A1 | 4/2004 | Morimoto |
| 7,630,123 B2 | 12/2009 | Kothari | | 2004/0070569 A1 | 4/2004 | Muthuswamy |

| | | |
|---|---|---|
| 2004/0070711 A1 | 4/2004 | Wen |
| 2004/0080938 A1 | 4/2004 | Holman |
| 2004/0085748 A1 | 5/2004 | Sugiura |
| 2004/0100796 A1 | 5/2004 | Ward |
| 2004/0115339 A1 | 6/2004 | Ito |
| 2004/0125048 A1 | 7/2004 | Fukuda |
| 2004/0141113 A1 | 7/2004 | Yun |
| 2004/0170373 A1 | 9/2004 | Kim |
| 2004/0174583 A1 | 9/2004 | Chen et al. |
| 2004/0188599 A1 | 9/2004 | Viktorovitch |
| 2004/0207995 A1 | 10/2004 | Park |
| 2004/0217264 A1 | 11/2004 | Wood |
| 2004/0228109 A1 | 11/2004 | Leu |
| 2004/0233357 A1 | 11/2004 | Fujimori |
| 2004/0246743 A1 | 12/2004 | Lee et al. |
| 2005/0002082 A1 | 1/2005 | Miles |
| 2005/0010568 A1 | 1/2005 | Nagatomo |
| 2005/0024849 A1 | 2/2005 | Parker |
| 2005/0041175 A1 | 2/2005 | Akiyama |
| 2005/0062410 A1 | 3/2005 | Bell et al. |
| 2005/0088719 A1 | 4/2005 | Patel |
| 2005/0133761 A1 | 6/2005 | Thielemans |
| 2005/0141065 A1 | 6/2005 | Masamoto |
| 2005/0146897 A1 | 7/2005 | Mimura |
| 2005/0206802 A1 | 9/2005 | Creemers |
| 2005/0213346 A1 | 9/2005 | Kao |
| 2005/0219218 A1 | 10/2005 | Harman |
| 2005/0231977 A1 | 10/2005 | Hayakawa |
| 2005/0231981 A1 | 10/2005 | Hoelen et al. |
| 2005/0248524 A1 | 11/2005 | Feng |
| 2005/0253980 A1 | 11/2005 | Saito |
| 2005/0254771 A1 | 11/2005 | Yamashita |
| 2005/0259302 A9 | 11/2005 | Metz et al. |
| 2005/0259939 A1 | 11/2005 | Rinko |
| 2006/0002141 A1 | 1/2006 | Ouderkirk et al. |
| 2006/0024017 A1 | 2/2006 | Page |
| 2006/0044291 A1 | 3/2006 | Willis |
| 2006/0050032 A1 | 3/2006 | Gunner |
| 2006/0051048 A1 | 3/2006 | Gardiner |
| 2006/0062016 A1* | 3/2006 | Dejima et al. ............... 362/600 |
| 2006/0066541 A1 | 3/2006 | Gally |
| 2006/0066586 A1 | 3/2006 | Gally |
| 2006/0066641 A1 | 3/2006 | Gally |
| 2006/0066935 A1 | 3/2006 | Cummings |
| 2006/0072315 A1 | 4/2006 | Han et al. |
| 2006/0072339 A1 | 4/2006 | Li et al. |
| 2006/0077124 A1 | 4/2006 | Gally |
| 2006/0077149 A1 | 4/2006 | Gally |
| 2006/0077153 A1 | 4/2006 | Cummings |
| 2006/0083028 A1 | 4/2006 | Sun et al. |
| 2006/0091824 A1 | 5/2006 | Pate |
| 2006/0109682 A1 | 5/2006 | Ko et al. |
| 2006/0109686 A1 | 5/2006 | Sugiura |
| 2006/0126142 A1 | 6/2006 | Choi |
| 2006/0132383 A1 | 6/2006 | Gally |
| 2006/0146575 A1 | 7/2006 | Saito |
| 2006/0164861 A1 | 7/2006 | Maeda |
| 2006/0164863 A1 | 7/2006 | Chang et al. |
| 2006/0181866 A1 | 8/2006 | Jung |
| 2006/0181903 A1 | 8/2006 | Okuwaki |
| 2006/0198013 A1 | 9/2006 | Sampsell |
| 2006/0209012 A1 | 9/2006 | Hagood, IV |
| 2006/0209385 A1 | 9/2006 | Liu |
| 2006/0227532 A1 | 10/2006 | Ko et al. |
| 2006/0262562 A1 | 11/2006 | Fukasawa |
| 2006/0265919 A1 | 11/2006 | Huang |
| 2006/0274400 A1 | 12/2006 | Miles |
| 2006/0279558 A1 | 12/2006 | Van Delden et al. |
| 2006/0285356 A1 | 12/2006 | Tseng |
| 2007/0031685 A1 | 2/2007 | Ko et al. |
| 2007/0064294 A1 | 3/2007 | Hoshino et al. |
| 2007/0081360 A1 | 4/2007 | Bailey |
| 2007/0086176 A1 | 4/2007 | Kanade et al. |
| 2007/0097694 A1 | 5/2007 | Faase |
| 2007/0116424 A1 | 5/2007 | Ting |
| 2007/0133226 A1 | 6/2007 | Mi |
| 2007/0133935 A1 | 6/2007 | Fine |
| 2007/0153243 A1 | 7/2007 | Mestha et al. |
| 2007/0171330 A1 | 7/2007 | Hung |
| 2007/0177405 A1 | 8/2007 | Chan |
| 2007/0187852 A1 | 8/2007 | Parker et al. |
| 2007/0189036 A1 | 8/2007 | Chen |
| 2007/0201234 A1 | 8/2007 | Ottermann |
| 2007/0216992 A1 | 9/2007 | Tzeng et al. |
| 2007/0229936 A1 | 10/2007 | Miles |
| 2007/0236774 A1 | 10/2007 | Gousev |
| 2007/0241340 A1 | 10/2007 | Pan |
| 2007/0253054 A1 | 11/2007 | Miles |
| 2007/0268695 A1 | 11/2007 | Seetzen |
| 2007/0279727 A1 | 12/2007 | Gandhi |
| 2007/0279935 A1 | 12/2007 | Gardiner |
| 2007/0291362 A1 | 12/2007 | Hill et al. |
| 2008/0030650 A1 | 2/2008 | Kitagawa |
| 2008/0031011 A1 | 2/2008 | Hayashi et al. |
| 2008/0043466 A1 | 2/2008 | Chakmakjian et al. |
| 2008/0049445 A1 | 2/2008 | Harbers |
| 2008/0084600 A1 | 4/2008 | Bita et al. |
| 2008/0089092 A1 | 4/2008 | Lee et al. |
| 2008/0094853 A1 | 4/2008 | Kim |
| 2008/0112039 A1 | 5/2008 | Chui |
| 2008/0137373 A1 | 6/2008 | Li |
| 2008/0151347 A1 | 6/2008 | Chui |
| 2008/0170179 A1 | 7/2008 | Shiraishi |
| 2008/0232135 A1 | 9/2008 | Kinder |
| 2008/0266333 A1 | 10/2008 | Silverstein et al. |
| 2008/0278460 A1 | 11/2008 | Arnett et al. |
| 2008/0285307 A1 | 11/2008 | Aylward |
| 2008/0285308 A1 | 11/2008 | Clary et al. |
| 2009/0015753 A1 | 1/2009 | Ye |
| 2009/0059346 A1 | 3/2009 | Xu |
| 2009/0086301 A1 | 4/2009 | Gally |
| 2009/0096956 A1 | 4/2009 | Uehara et al. |
| 2009/0101623 A1 | 4/2009 | Bita et al. |
| 2009/0103166 A1 | 4/2009 | Khazeni et al. |
| 2009/0126777 A1 | 5/2009 | Khazeni et al. |
| 2009/0147332 A1 | 6/2009 | Bita et al. |
| 2009/0147535 A1 | 6/2009 | Mienko |
| 2009/0168459 A1 | 7/2009 | Holman |
| 2009/0196068 A1 | 8/2009 | Wang |
| 2009/0199893 A1 | 8/2009 | Bita |
| 2009/0199900 A1 | 8/2009 | Bita |
| 2009/0201301 A1 | 8/2009 | Mienko |
| 2009/0201565 A1 | 8/2009 | Bita et al. |
| 2009/0231877 A1 | 9/2009 | Mienko |
| 2009/0251752 A1 | 10/2009 | Gruhlke |
| 2009/0251783 A1 | 10/2009 | Huibers |
| 2009/0257108 A1 | 10/2009 | Gruhlke |
| 2009/0303417 A1 | 12/2009 | Mizushima et al. |
| 2009/0303746 A1 | 12/2009 | Wang |
| 2009/0320899 A1 | 12/2009 | Schiavoni |
| 2009/0323144 A1 | 12/2009 | Gruhlke |
| 2010/0033988 A1 | 2/2010 | Chiu |
| 2010/0149624 A1 | 6/2010 | Kothari |
| 2010/0156953 A1 | 6/2010 | Nevitt |
| 2010/0157406 A1 | 6/2010 | Gruhlke |
| 2010/0172012 A1 | 7/2010 | Sampsell |
| 2010/0182308 A1 | 7/2010 | Holman |
| 2010/0188367 A1 | 7/2010 | Nagafuji et al. |
| 2010/0195310 A1 | 8/2010 | Baar |
| 2010/0214642 A1 | 8/2010 | Miles |
| 2010/0226118 A1 | 9/2010 | Baar |
| 2010/0238529 A1 | 9/2010 | Sampsell et al. |
| 2010/0245975 A1 | 9/2010 | Cummings |
| 2010/0302802 A1 | 12/2010 | Bita |
| 2011/0025727 A1 | 2/2011 | Li |
| 2011/0032214 A1 | 2/2011 | Gruhlke |
| 2011/0122479 A1 | 5/2011 | Sampsell |

FOREIGN PATENT DOCUMENTS

| | | |
|---|---|---|
| CN | 1272922 | 11/2000 |
| CN | 1286424 | 3/2001 |
| CN | 1381752 | 11/2002 |
| CN | 1517743 | 8/2004 |
| CN | 1639596 A | 7/2005 |
| CN | 1755494 A | 4/2006 |
| CN | 1795403 A | 6/2006 |
| CN | 101226259 | 7/2008 |
| DE | 34 02 746 | 8/1985 |

| | | | | | |
|---|---|---|---|---|---|
| DE | 196 22 748 | 12/1997 | JP | 2001 343514 | 12/2001 |
| DE | 199 42 513 | 3/2001 | JP | 2002 062505 A | 2/2002 |
| DE | 10 2007 02509 | 12/2008 | JP | 2002 72284 | 3/2002 |
| EP | 0 590 511 | 4/1994 | JP | 2002 090549 | 3/2002 |
| EP | 0 621 500 | 10/1994 | JP | 2002-098838 | 4/2002 |
| EP | 0 667 548 | 8/1995 | JP | 2002-108227 | 4/2002 |
| EP | 0 822 441 | 2/1998 | JP | 2002-124113 | 4/2002 |
| EP | 0 855 745 | 7/1998 | JP | 2002-131551 | 5/2002 |
| EP | 0 879 991 | 11/1998 | JP | 2002 174780 | 6/2002 |
| EP | 0 895 274 | 2/1999 | JP | 2002 196151 | 7/2002 |
| EP | 0 907 050 | 4/1999 | JP | 2002-229023 | 8/2002 |
| EP | 0 984 314 | 3/2000 | JP | 2002 245835 | 8/2002 |
| EP | 1 014 161 | 6/2000 | JP | 2002-297044 | 10/2002 |
| EP | 1 079 264 | 2/2001 | JP | 2002-365438 | 12/2002 |
| EP | 1 081 633 | 3/2001 | JP | 2003 007114 | 1/2003 |
| EP | 1 089 115 | 4/2001 | JP | 2003-021821 A | 1/2003 |
| EP | 1 093 105 | 4/2001 | JP | 2003 057652 | 2/2003 |
| EP | 1 113 218 | 7/2001 | JP | 2003 066451 | 3/2003 |
| EP | 1 127 984 | 8/2001 | JP | 2003-149642 | 5/2003 |
| EP | 1 139 015 | 10/2001 | JP | 2003-149643 | 5/2003 |
| EP | 1 143 270 | 10/2001 | JP | 2003 173713 | 6/2003 |
| EP | 1 199 512 | 4/2002 | JP | 2003 177336 | 6/2003 |
| EP | 1 251 454 | 10/2002 | JP | 2003-177405 | 6/2003 |
| EP | 1 271 223 | 1/2003 | JP | 2003 188959 | 7/2003 |
| EP | 1 296 094 | 3/2003 | JP | 2003-315694 | 11/2003 |
| EP | 1 306 609 | 5/2003 | JP | 2003 344881 | 12/2003 |
| EP | 1 336 876 | 8/2003 | JP | 2004-012918 | 1/2004 |
| EP | 1 389 775 | 2/2004 | JP | 2004-062099 | 2/2004 |
| EP | 1 413 543 | 4/2004 | JP | 2004-111278 | 4/2004 |
| EP | 1 437 610 | 7/2004 | JP | 2004-510185 | 4/2004 |
| EP | 1 445 629 | 8/2004 | JP | 2004-206049 | 7/2004 |
| EP | 1 519 218 | 3/2005 | JP | 2004-212922 | 7/2004 |
| EP | 1 531 302 | 5/2005 | JP | 2005-316178 | 11/2005 |
| EP | 1 544 537 | 6/2005 | JP | 2006-039056 | 2/2006 |
| EP | 1 640 764 | 3/2006 | JP | 2006-065360 A | 3/2006 |
| EP | 1 640 961 | 3/2006 | JP | 2006 099105 | 4/2006 |
| EP | 1 698 918 | 9/2006 | JP | 2007 027150 | 2/2007 |
| EP | 1 734 401 | 12/2006 | JP | 2007-218540 A | 8/2007 |
| EP | 1 832 806 | 9/2007 | JP | 2009 0300966 | 12/2009 |
| EP | 1 862 730 A1 | 12/2007 | KR | 2002 010322 | 2/2002 |
| EP | 1 870 635 | 12/2007 | TW | 567388 | 12/2003 |
| EP | 1 975 651 | 10/2008 | WO | WO 95/01584 | 1/1995 |
| GB | 2 260 203 | 4/1993 | WO | WO 95/14256 | 5/1995 |
| GB | 2 278 222 | 11/1994 | WO | WO 95/30924 | 11/1995 |
| GB | 2 315 356 | 1/1998 | WO | WO 96/08833 | 3/1996 |
| GB | 2 340 281 | 2/2000 | WO | WO 96/16348 | 5/1996 |
| GB | 2 351 834 | 1/2001 | WO | WO 97/01240 | 1/1997 |
| JP | 60 242408 | 12/1985 | WO | WO 97/16756 | 5/1997 |
| JP | U04-053220 | 5/1992 | WO | WO 97/17628 | 5/1997 |
| JP | 05 281479 | 10/1993 | WO | WO 97/46908 | 12/1997 |
| JP | 07-509327 | 10/1995 | WO | WO 98/19201 | 5/1998 |
| JP | 08 018990 | 1/1996 | WO | WO 98/32047 | 7/1998 |
| JP | 09 022012 | 1/1997 | WO | WO 98/35182 | 8/1998 |
| JP | 09 160032 | 6/1997 | WO | WO 99/04296 A | 1/1999 |
| JP | 09 171111 | 6/1997 | WO | WO 99/52006 A2 | 10/1999 |
| JP | 09-189910 | 7/1997 | WO | WO 99/63394 | 12/1999 |
| JP | 09-507920 | 8/1997 | WO | WO 99/067678 A2 | 12/1999 |
| JP | 09 311333 | 12/1997 | WO | WO 99/67680 | 12/1999 |
| JP | 10 202948 | 8/1998 | WO | WO 00/50807 | 8/2000 |
| JP | 11 002712 | 1/1999 | WO | WO 01/29148 | 4/2001 |
| JP | 11 167808 | 6/1999 | WO | WO 01/81994 | 11/2001 |
| JP | 11 174234 | 7/1999 | WO | WO 01/84228 | 11/2001 |
| JP | 11 184387 | 7/1999 | WO | WO 01/84229 | 11/2001 |
| JP | 11 211999 | 8/1999 | WO | WO 02/06858 | 1/2002 |
| JP | 11 231321 | 8/1999 | WO | WO 02/071132 | 9/2002 |
| JP | 11 232919 | 8/1999 | WO | WO 02/097324 | 12/2002 |
| JP | 11 326898 | 11/1999 | WO | WO 03/007049 | 1/2003 |
| JP | 2000 500245 | 1/2000 | WO | WO 03/032058 | 4/2003 |
| JP | 2000 075293 | 3/2000 | WO | WO 03/038509 | 5/2003 |
| JP | 2000 081848 | 3/2000 | WO | WO 03/056876 | 7/2003 |
| JP | 2000 147262 | 5/2000 | WO | WO 03/062912 | 7/2003 |
| JP | 2000 181367 | 6/2000 | WO | WO 03/075207 | 9/2003 |
| JP | 2000 193933 | 7/2000 | WO | WO 2004/006003 | 1/2004 |
| JP | 2000 514568 | 10/2000 | WO | WO 2004/027514 | 4/2004 |
| JP | 2000 305074 | 11/2000 | WO | WO 2004/036270 | 4/2004 |
| JP | 2000 314882 | 11/2000 | WO | WO 2004/068182 | 8/2004 |
| JP | 2001-021883 | 1/2001 | WO | WO 2004/068460 | 8/2004 |
| JP | 2001-283622 | 10/2001 | WO | WO 2004/088372 | 10/2004 |
| JP | 2001 305312 | 10/2001 | WO | WO 2004/114418 A1 | 12/2004 |

| | | |
|---|---|---|
| WO | WO 2005/011012 | 2/2005 |
| WO | WO 2005/011012 A1 | 2/2005 |
| WO | WO 2005/076051 | 8/2005 |
| WO | WO 2005/088367 | 9/2005 |
| WO | WO 2005/088367 A1 | 9/2005 |
| WO | WO 2006/002141 A2 | 1/2006 |
| WO | WO 2006/008702 | 1/2006 |
| WO | WO 2006/036451 | 4/2006 |
| WO | WO 2006/036496 | 4/2006 |
| WO | WO 2008/045218 | 4/2008 |
| WO | WO 2008/045311 | 4/2008 |
| WO | WO 2008/045311 A2 | 4/2008 |
| WO | WO 2008/045362 | 4/2008 |
| WO | WO 2008/045364 | 4/2008 |
| WO | WO 2008/099989 A1 | 8/2008 |
| WO | WO 2008/145096 | 12/2008 |

OTHER PUBLICATIONS

Invitation to Pay Additional Fees for International Appl. No. PCT/US2007/021376, mailed Mar. 27, 2008.

International Search Report and Written Opinion for International Appl. No. PCT/US2007/021376, mailed Jun. 18, 2008.

International Preliminary Report on Patentability for International Appl. No. PCT/US2007/021376, mailed Jun. 26, 2009.

Neal T.D., et al., "Surface Plasmon enhanced emission from dye doped polymer layers," Optics Express Opt. Soc. America, USA, vol.13, No. 14, pp. 5522-5527, Jul. 11, 2005.

International Preliminary Report on Patentability in PCT/US2007/021376; (International Publication No. WO 2008/045311) dated Jun. 26, 2009.

International Search Report and Written Opinion in PCT/US2007/021376; (International Publication No. WO 2008/045311) dated Jun. 18, 2008.

Aratani K. et. al., "Surface Micromachined Tuneable Interferometer Array," Sensors and Actuators A, vol. A43, No. 1/3, pp. 17-23, May 1994.

Fan et al., "Channel Drop Filters in Photonic Crystals", Optics Express, vol. 3, No. 1, pp. 4-11, 1998.

Giles et al., "Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.

Goosen, "MEMS-Based Variable Optical Interference Devices", IEEE/LEOS International Conference on Optical MEMS, pp. 17-18, Aug. 2000.

Imenes et al., "Spectral beam splitting technology for increased conversion efficiency in solar concentrating systems: a review" Solar Energy Materials, Elsevier Science Publishers B.V. Amsterdam, NL, vol. 84, Oct. 1, 2004, pp. 19-69, XP002474546.

Little et al., "Vertically Coupled Microring Rosonator Channel Dropping Filter", IEEE Photonics Technology Letters, vol. 11, No. 2, pp. 215-217, 1999.

Maeda et al., "A study of a high quality front lighting system for reflective full-color liquid crystal displays", Record of Electrical and Communication, Engineering Conversazione Tohoku University, v 78, n 1, 415-16, Sep. 2009, ISSN: 0385-7719.

Magel, "Integrated Optic Devices Using Micromachined Metal Membranes", SPIE vol. 2686, 0-8194-2060-3, pp. 54-63, 1996.

Mehregany, et. al., "MEMS applications in Optical Systems," IEEE/LEOS 1996 Summer Topical Meetings, pp. 75-76, Aug. 1996.

Miles, M.W., "A Mems Based Interferometric Modulator (IMOD) for Display Applications," Proceedings of Sensors Expo, pp. 281-284, Oct. 21, 1997, XP009058455.

Obi et. al., Fabrication of Optical MEMS in SOL-GEL Materials; IEEE/LEOS International Conference on Optical MEMS, pp. 39-40, Aug. 2002.

Oliner, "Radiating Elements and Mutual Coupling," Microwave Scanning Antennas, vol. 2, pp. 131-157 and pp. 190-194, 1966.

Osram Opto Semiconductors, "Multi Micro SIDELED," Preliminary Data, Dec. 11, 2008.

Yan, et al., "Edge-Lighting Light Guide Plate Based on Micro-Prism for Liquid Crystal Display," Journal of Display Technology, vol. 5, No. 9, pp. 355-357, Sep. 2009.

Yu, et al., "Design Optimization and Stamper Fabrication of Light Guiding Plates Using Silicon Based Micro-Features," IEEE Symposium on DTIP of MEMS/MOEMS, Rome, Apr. 1-3, 2009.

Zhou et al., "Waveguide Panel Display Using Electromechanical Spatial Modulators" SID Digest, vol. XXIX, 1998.

Idé et al. "Dot pattern generation technique using molecular dynamics" J. Opt. Soc. Am. A/vol. 20, No. 2/Feb. 2003.

* cited by examiner

|  | Column Output Signals | |
|---|---|---|
|  | +$V_{bias}$ | -$V_{bias}$ |
| Row Output Signals  0 | Stable | Stable |
| +ΔV | Relax | Actuate |
| −ΔV | Actuate | Relax |

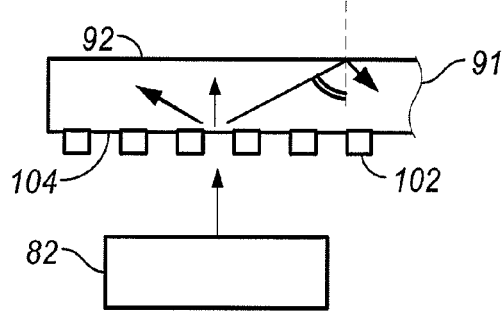
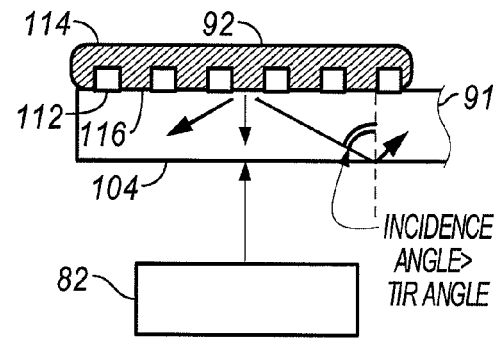
FIG. 10  FIG. 11
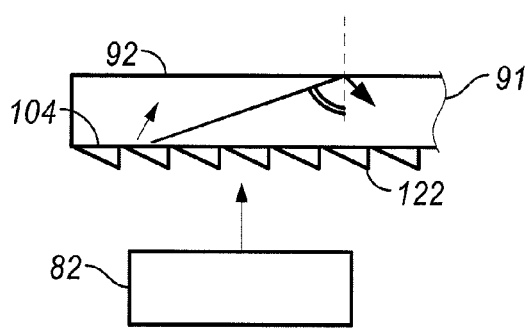
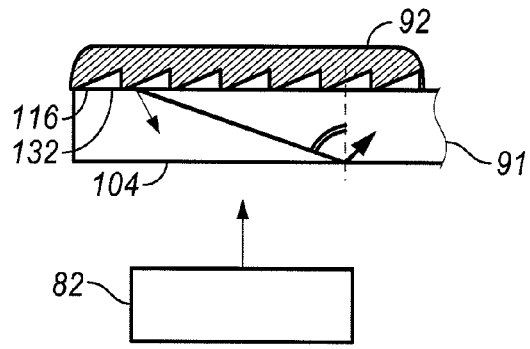
FIG. 12  FIG. 13

US 8,061,882 B2

ILLUMINATION DEVICE WITH BUILT-IN LIGHT COUPLER

CROSS-REFERENCE TO RELATED APPLICATIONS

This application is a continuation of International Application No. PCT/US2007/021376, filed Oct. 5, 2007, which claims the benefit of U.S. Provisional Patent Application No. 60/850,189, entitled "Illumination Device With Built-in Light Coupler," filed Oct. 6, 2006. The disclosures of all the above-referenced prior applications are considered part of the disclosure of this application, and are incorporated by reference herein.

BACKGROUND

1. Field of the Invention

The field of the invention relates to microelectromechanical systems (MEMS).

2. Description of the Related Art

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other illumination and/or devices.

One embodiment includes an illumination device comprising a light guide comprising a front surface, a back surface, a light coupling section configured to receive optical energy from a light source in to the light guide through said front surface or said back surface at an angle about normal to the optical energy receiving surface, and further configured to direct light through said light guide, and a light turning section configured to redirect out of the light guide at least a portion of the light received from said light coupling section, said redirected light at an angle about normal to the optical energy receiving surface. The illumination device can further comprise a light source disposed with respect to said light coupling portion to inject light into said light coupling portion, and the light source can be disposed adjacent to said optical energy receiving surface of the light coupling section such that at least a portion of the provided light is incident on said optical energy receiving surface at an angle about normal to said optical energy receiving surface.

Another embodiment includes an illumination device comprising means for guiding light, said guiding light means having a front and a back surface, said light guiding means comprising means for coupling optical energy that is received from a light source in to the light guiding means through said front surface or said back surface at an angle about normal to the optical energy receiving surface, and further configured to direct light through said light guiding means, and means for turning light to redirect out of the light guiding means at least a portion of the light received from said coupling means, said redirected light at an angle about normal to the optical energy receiving surface.

Another embodiment includes a method of manufacturing an illumination device, said method comprising forming a substantially planar light guide having a front surface and a back surface that define the front surfaces and back surfaces of a light coupling section and a light turning section disposed adjacently in said light guide, said light coupling section configured to receive optical energy from a light source through said front or back surface at an angle substantially normal to the optical energy receiving front or back surface and propagate the light through the light guide to said light turning section, and wherein said light turning section is configured to direct light from light coupling section out of said light guide.

Another embodiment includes a display device fabricated by the method of described in the preceding paragraph.

Another embodiment includes a method of illuminating an array of interferometric modulators positioned behind a light guide so that the light guide is between light modulating surfaces of said array and ambient light, the method comprising receiving optical energy on a back surface of a substantially planar light guide, wherein at least a portion of the optical energy is received from a direction about normal to said back surface, coupling the received optical energy into the light guide such that at least a portion of the received optical energy propagates through said light guide, and redirecting light propagating in the light guide towards an array of interferometric modulators positioned parallel and adjacent to said back surface. The method can further include providing optical energy on a portion of said back surface, wherein at least a portion of said optical energy is provided in a direction about normal to said back surface.

Another embodiment includes a method of manufacturing a master mold of an illumination device comprising providing a crystalline substrate, forming a first mask on the substrate, the first mask having openings about every $10^4$-$10^6$ nm, performing an anisotropic wet etch of said substrate through said first mask, forming a second mask on the substrate, the second mask having openings about every $10^2$-$10^3$ nm, performing an anisotropic dry etch of said substrate through said second mask, and removing the first and second masks.

Another embodiment includes an illumination device comprising a light guide comprising a front surface, a back surface, a light coupling section comprising light emitting material, said coupling section configured to receive optical energy from a light source in to the light guide through said front surface or said back surface at an angle about normal to the optical energy receiving surface, and further configured to direct light through said light guide, and a light turning section configured to redirect out of the light guide at least a portion of the light received from said light coupling section, said redirected light at an angle about normal to the optical energy receiving surface.

BRIEF DESCRIPTION OF THE DRAWINGS

FIG. 10 is a schematic illustrating a transmissive surface diffraction grating in a light coupler section.

FIG. 11 is a schematic illustrating a reflective surface diffraction grating in a light coupler section.

FIG. 12 is a schematic illustrating a transmissive blazed surface diffraction grating in a light coupler section.

FIG. 13 is a schematic illustrating a reflective blazed surface diffraction grating in a light coupler section.

DETAILED DESCRIPTION OF CERTAIN EMBODIMENTS

Figure 1:
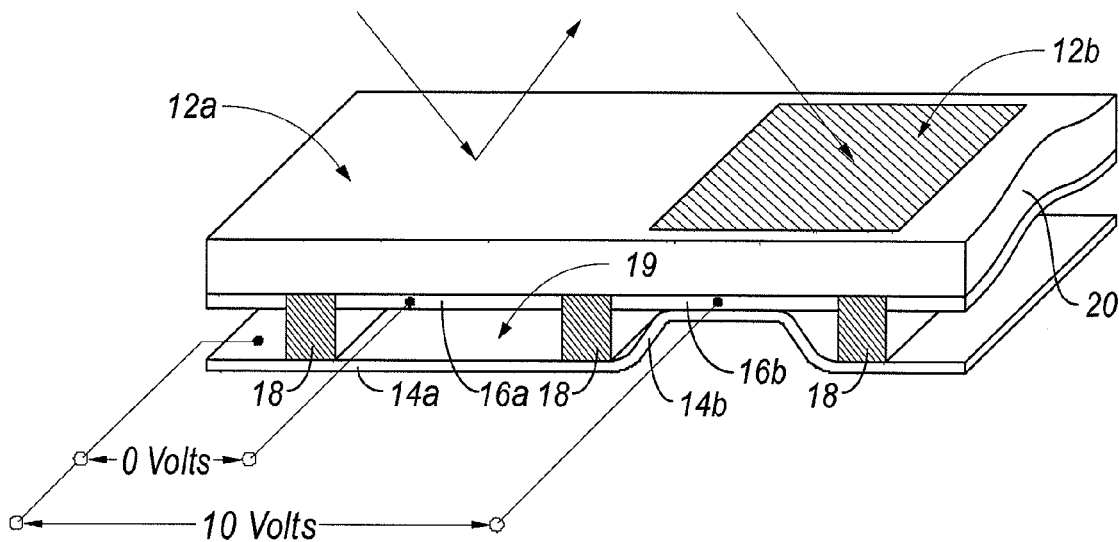
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments of the invention. However, the invention can be embodied in a multitude of different ways. In this description, reference is made to the drawings wherein like parts are designated with like numerals throughout. Reference in this specification to "one aspect" or "an aspect" means that a particular feature, structure, or characteristic described in connection with the aspect is included in at least one aspect. The appearances of the phrase "in one aspect," "according to one aspect," or "in some aspects" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

An interferometric modulator display can employ a reflective pixel design. When sufficient ambient light is not available, an illumination system comprising a front illuminator that comprises a planar light guide disposed forward the reflective pixels can be used to provide light thereto. As market forces drive for a thinner and thinner display module thickness, each of the display components are subject to thickness optimization. In the area of the illumination apparatus, reducing its thickness may be accomplished by reducing the thickness of the light source that delivers light into the front light. While the planar light guide in front of the reflective pixels can be made thinner and thinner, there are practical limitations to how thin light sources can be made (e.g., LEDs have light emitting dies of 0.2-0.3 mm size, and the LED package further adds to this size). If edge injection is used to couple a light source to a planar light guide, reducing the thickness of the planar light guide beyond that of the light source leads to optical inefficiency. In particular, not all the emitted light can be delivered into the planar light guide due to the size mismatch between the emitting aperture of the light source and the input aperture of the light guide. Various embodiments disclosed herein allow a design and fabrication of a thin film illumination system that may overcome these and other problems by employing a light coupling region which receives light from a light source through a surface of the light guide rather than the edge of the light guide. Such embodiments provide both desired thin light guide and improved light injection efficiency.

Accordingly, various illustrative embodiments of coupling a light source through the surface of a thin illumination film are described herein. Some of these embodiments include using diffractive microstructures, solution, prismatic microstructures, and/or light emission-based elements to couple light from an external source (LED(s), light bar, etc.) to waveguide modes within the front light. In such embodiments, this light coupling region can reside outside the viewable area of a display. In a preferred embodiment the illumination film is manufactured such that both the light coupling and light turning regions are created in the same step, e.g., via embossing. Other designs are also possible.

One embodiment of an interferometric modulator display comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiments one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this FIGURE) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
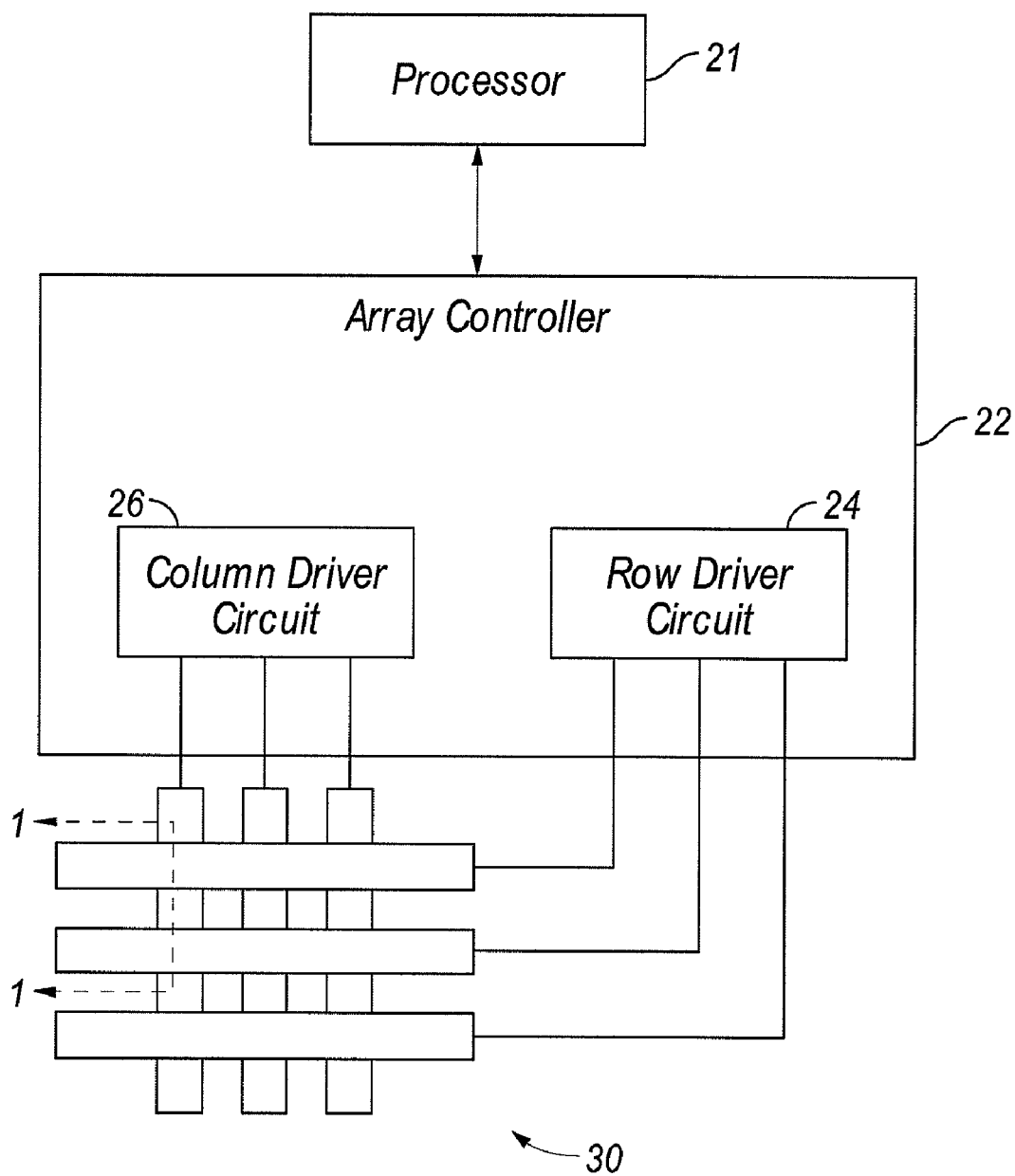
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
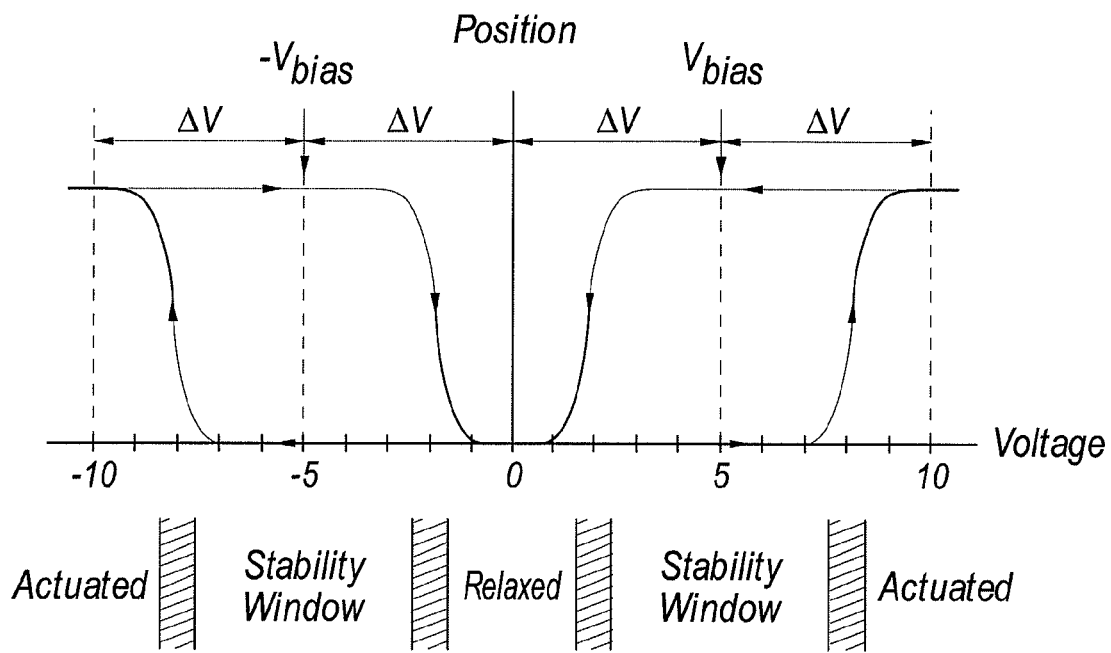
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
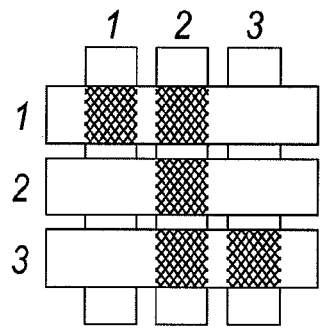
FIG. 5A illustrates one exemplary frame of display data in the 3×3 interferometric modulator display of FIG. 2.
Figure 5B:
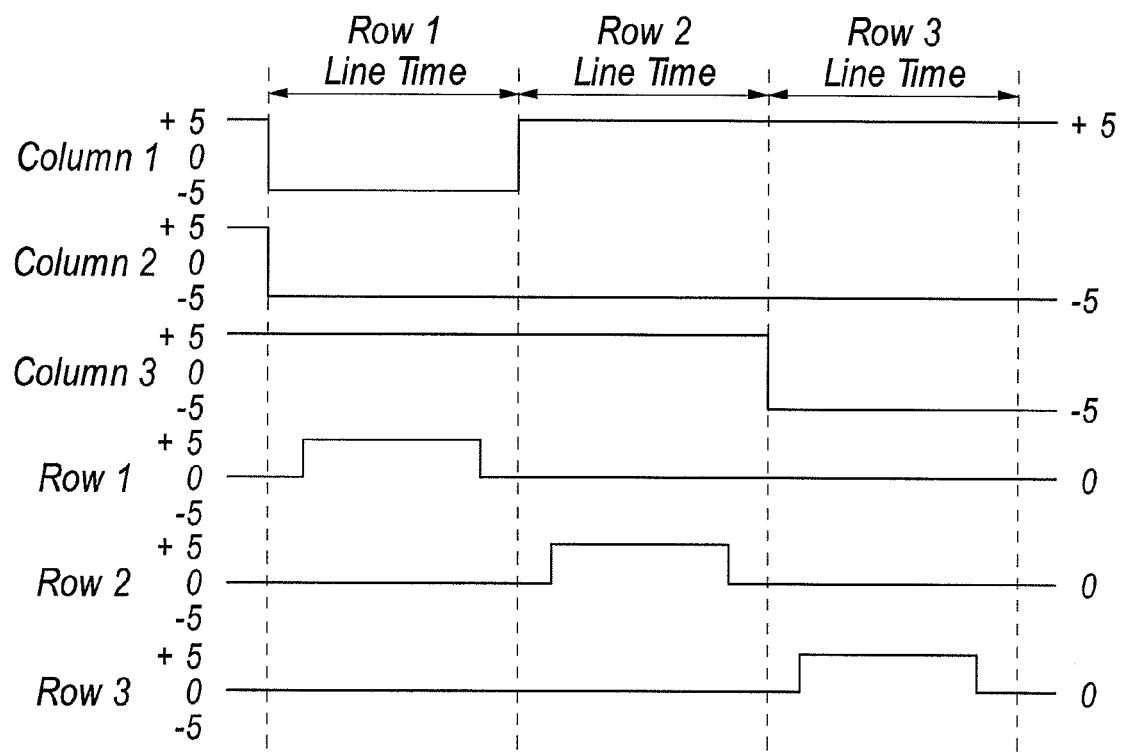
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
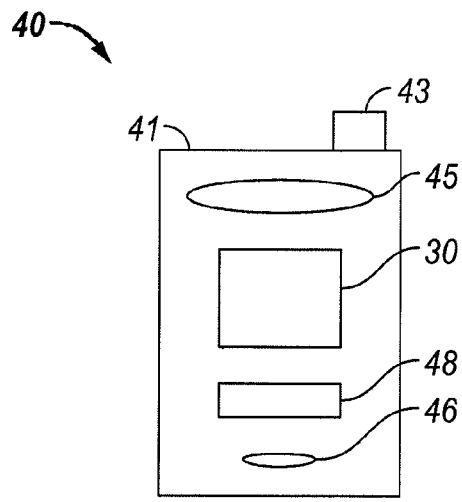
FIGS. 6A and 6B are system block diagrams illustrating an embodiment of a visual display device comprising a plurality of interferometric modulators.
Figure 6B:
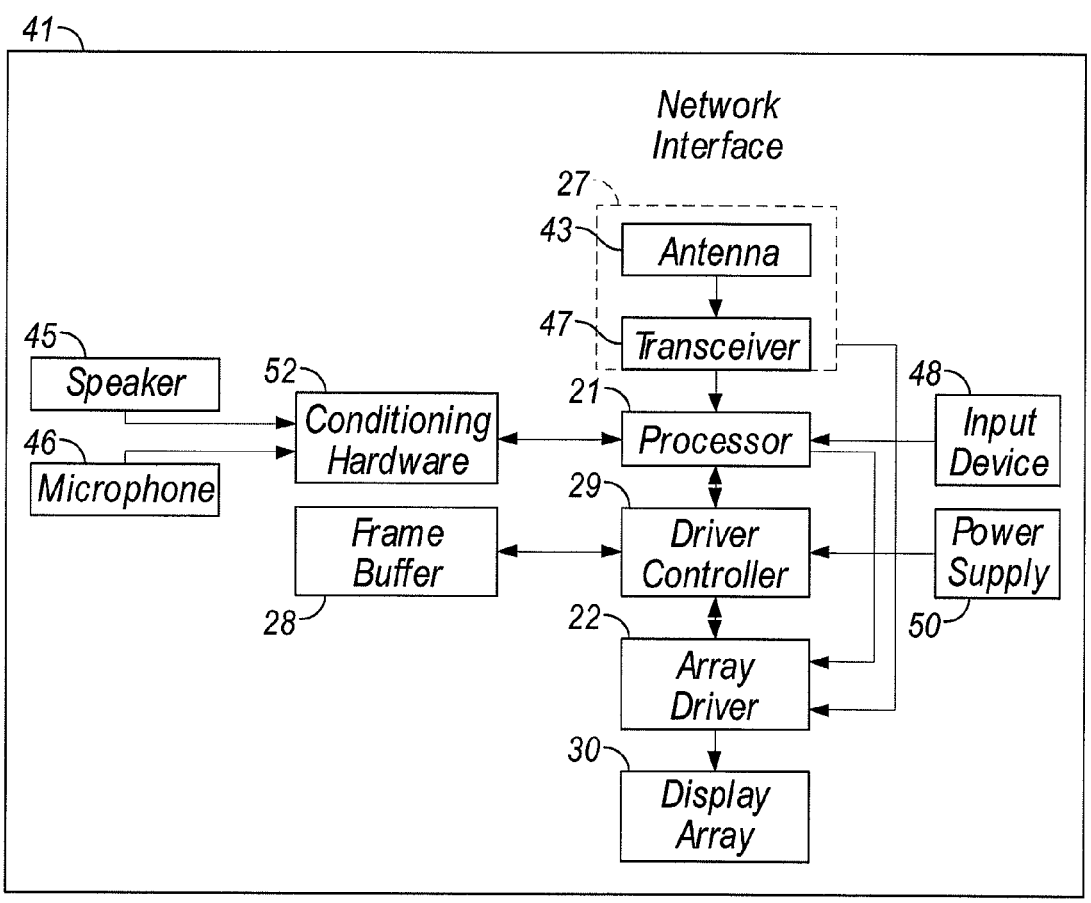

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
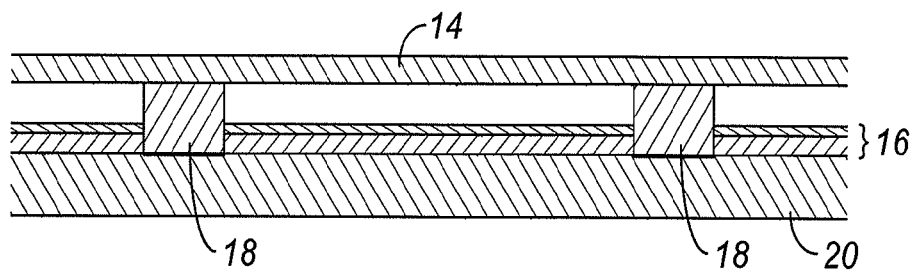
FIG. 7A is a cross section of the device of FIG. 1.
Figure 7B:
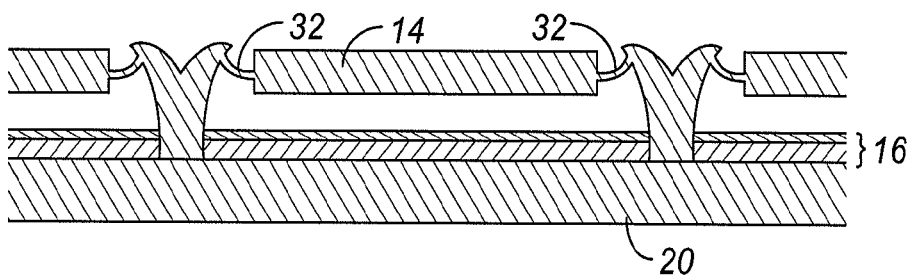
FIG. 7B is a cross section of an alternative embodiment of an interferometric modulator.
Figure 7C:
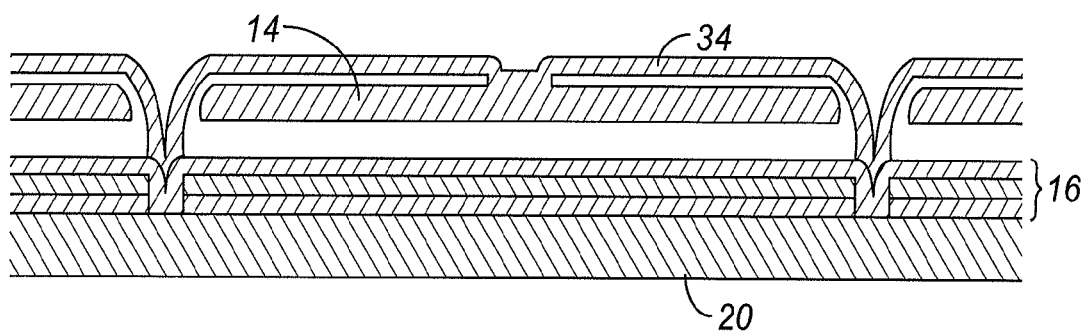
FIG. 7C is a cross section of another alternative embodiment of an interferometric modulator.
Figure 7D:
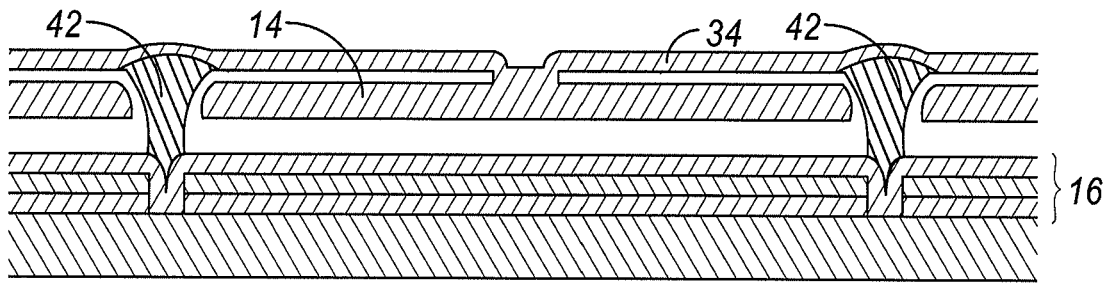
FIG. 7D is a cross section of yet another alternative embodiment of an interferometric modulator.
Figure 7E:
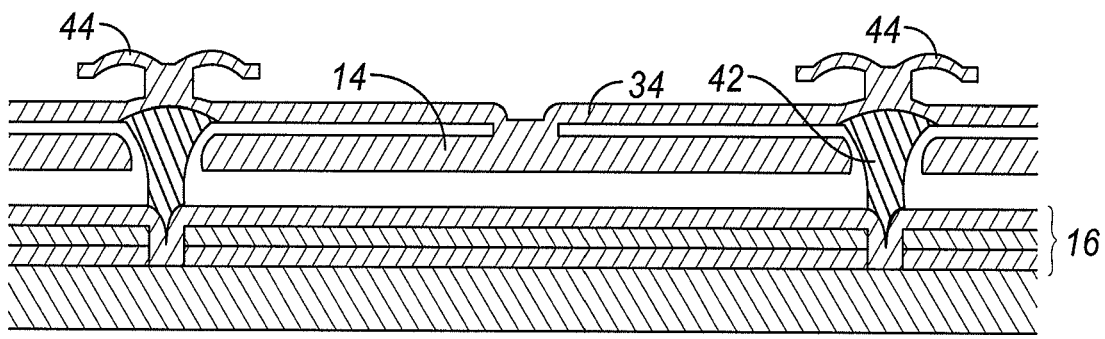
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
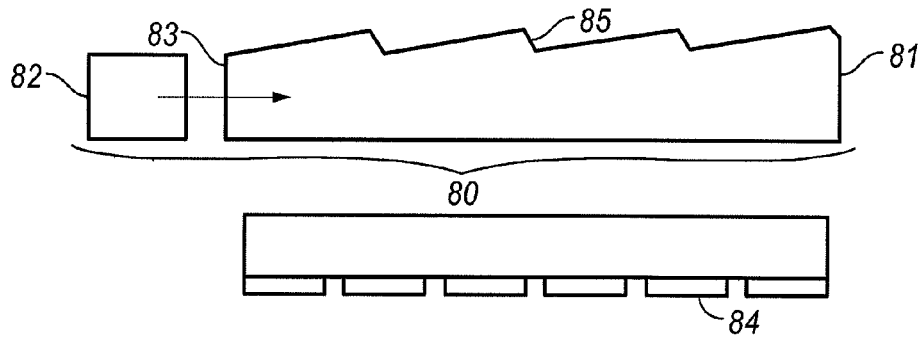
FIG. 8 illustrates one embodiment of a front illumination device that can be used to illuminate a reflective interferometric modulator display.

Interferometric modulators can be configured into many types of reflective displays which use ambient light to convey information from the display. As described above, in conditions of low ambient light, an illumination apparatus can be used to illuminate a reflective interferometric modulator display. For example, FIG. 8 illustrates one embodiment of a front illumination device 80 that can be used to illuminate a reflective interferometric modulator display 84. The front illumination device 80 can include a light source 82 and a front illuminator 81, a light guide comprising for example, one or more film, film stack, sheet, or slab-like component. This front illuminator 81 includes turning features 85 that direct light propagating in the light guide onto the interferometric modulator display 84. The light source 82 is coupled to an edge 83 of the light guide 81 ("edge-coupled") to provide light to interferometric modulators configured in a reflective display 84. A portion of light emitted by the light source 82 enters the edge 83 of the light guide 81 and propagates throughout the light guide 81 utilizing the phenomenon of total internal reflection. As described above, the light guide 81 can include turning features 85 that re-direct a portion of the light propagating through the film towards the display 84. The front illuminator/light guide 81 is relatively thick edge to provide a large enough edge 83 to receive light from the light source 82. However, this configuration causes the illumination to device 80 be relatively thick to accommodate the light guide 81.

As market forces dictate providing increasingly thinner display modules, each of the display components are subject to pressure to reduce thickness. Reducing the thickness of a front illumination device 80 typically requires reducing the thickness of the light source 82. While the front illuminator/light guide 81 can be made thinner, there are practical limitations to how thin light sources can be made. In one example, a LED has a light emitting die thickness of 0.2-0.3 mm, and the LED package further adds to this thickness. For edge-coupled embodiments, reducing the thickness of the light guide 81 beyond that of the light source 82 leads to inefficient optical coupling of the light source to the light guide because not all the emitted light can be delivered into the light guide 81. This is due to the physical size mismatch between the emitting aperture of the light source 82 and the input aperture (edge surface 83) of the light guide 81, which may comprise a film or film stack in some embodiments. Accordingly, reducing the thickness of a light guide 81 involves a tradeoff between having a suitably a thin light guide, e.g., a thin film or film stack, and having light injection efficiency.

Figure 9A:
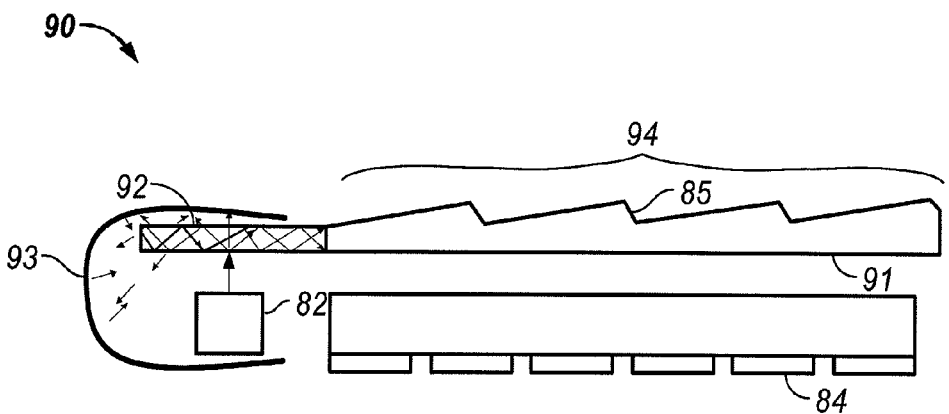
FIG. 9A is a schematic that illustrates an embodiment comprising an illumination device with both a surface coupling section and a light turning section.

FIG. 9A illustrates an example embodiment of an illumination device with both a surface coupling section and a light turning section that overcomes the above-discussed problems of edge-coupled embodiments. The embodiment can include light coupling of various means (specific illustrations of which are described below) to couple a light source through the surface of a front illumination device that propagates the light to a reflective interferometric modulator display (or another type of reflective display). The embodiment in FIG. 9A includes a front illumination device 90 having a light guide 91 placed "above" an interferometric modulator display 84 so that the light guide 91 is between the interferometric display 84 and ambient light illuminating the display. The light guide 91 is typically a substantially planar structure that may comprise one or more films, film stacks, sheets, or slab-like components. Although the light guide is described herein as substantially "planar," it is appreciated that the light guide, or portions of the light guide, may have surface features for reflecting, diffracting, refracting, or scattering light, or providing light using light emitting materials, such that the light guide surface may not be smooth.

The front illumination device 90 includes a light turning section 94 which comprises a portion of the light guide 91. The light turning section 94 may also be referred to herein as the "illumination section" or "region" which operates to illuminate or distribute light across the reflective display 84. The light turning section 94 has a "front" surface facing outward towards any ambient light, and a "back" surface facing inwards towards the reflective display 84. The light turning section 94 may include one or more light turning features 85. The light turning features 85 illustrated in FIG. 9A comprise prismatic features. However, in other embodiments, other reflective, diffractive (including volume holographic diffraction gratings) or other types of light-redirection structures can be used. Light turning features 85 can be configured having consistent or varied spacing and/or periodicity, and be of different relative size and shape than those illustrated in FIG. 9A. Light turning features in the light turning section 94 can be disposed on or near the front or back surface of the light turning guide 94 (e.g., disposed inside the light turning section 94 near the surface). The light turning section 94 is positioned over the display 84 such that the light turning features 85 can direct light to interferometric modulator pixels in the display 84.

The illumination device 90 also includes a light coupler section 92 and a light source 82. The light coupler section 92 comprises a portion of the light guide 91 which receives optical energy (generally referred to herein as "light") from the light source 82. It is appreciated that in some examples described herein the emission from a light source may be in the visible spectrum and in other cases it may be in the non-visible spectrum (e.g., UV), and references to a light source emission (e.g., "optical energy" or "light") should not be limited to just the visible spectrum). The light source 82 is positioned to provide light into the light coupler section 92. Specifically, the configuration and/or position of the light source 82, and the configuration of the light coupler section 92, allows light to enter a surface of the light guide 91 in the light coupler section 92, where the surface is a surface other than, or in addition to, the edge of the light guide 91.

Figure 9B:
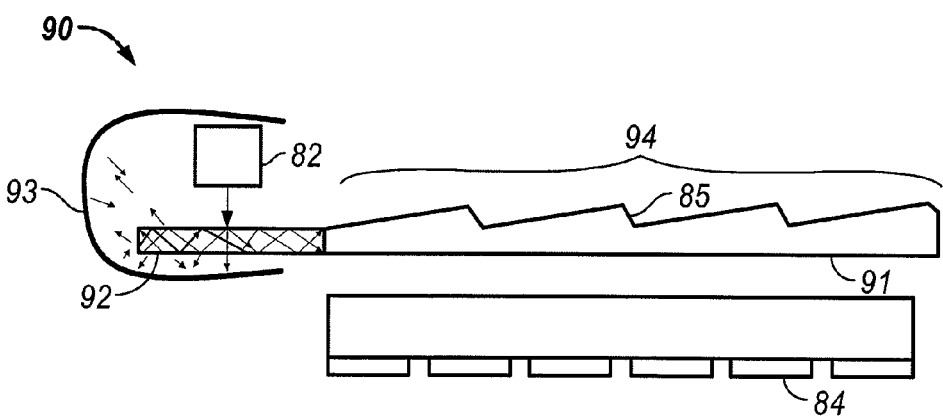
FIG. 9B is a schematic that illustrates another embodiment comprising an illumination device with both a surface coupling section and a light turning section.

In some embodiments, the surface of the light guide 91 that receives the emitted light is the surface proximal to the display 84, as shown in FIG. 9A. In some embodiments, a light source 82 is positioned to emit light to a surface of the light guide 91 distal to the display 84. As used herein, the proximal surface of the light guide 91 refers to the back surface that is adjacent to the display 84, and the distal surface refers to the surface of the light guide 91 that is positioned away from the display 84, that is, the surface of the light guide 91 that normally receives ambient light. In one example, the light source 82 is disposed on the opposite side of the light coupler section 92 as illustrated in FIG. 9B. However, such an embodiment may result in a thicker display. In certain embodiments (for example as illustrated in FIG. 9A) the surface which receives the light from the light source 82 is (substantially) parallel to the display 84 and is located outside of the display 84 viewing area. The light coupler section 92 can include a variety of coupling means to receive light from the light source 82 and direct the light to propagate into the light turning section 94 of the illuminator 91. Light entering the light guide 91 can be diffracted, reflected, scattered, or absorbed and re-emitted by optical features, surface volume structures and/or structured coatings incorporated within the coupler region 92 of the light guide 91. Such features, surface volume structures and structural coatings can be disposed inside or on a surface of the light coupler section 92. At least some of the coupled light propagates throughout the light guide 91 through total internal reflection. As light propagates through the light guide 91, a portion of the light reflects off of one or more of the light turning features 85 in the light guide 91 and propagates to a display 84. The display 84 can comprise interferometric display elements, which reflect or absorb the light depending on their interferometric state.

The light source 82 can comprise one or more light emitting elements, for example, an LED, a light bar, or a cold cathode florescent lamp (CCFL). In some embodiments, a single LED is used while in other embodiments up to five or more LED's are used. In some embodiments, the light source 82 emits light directly into the light coupler section 92. In some embodiments, the light source 82 includes a light emitting element and a light spreading element (e.g., a light bar) which receives the light from one or more light emitting elements, (e.g., such as a single LED), which are effectively point sources and provides the light to the light coupler section 92 as a line source. The light is then received by light coupler section 92 and then is sent through the light guide 91, being transformed from the line source into a distributed area source so as to provide sufficiently uniform illumination across the display 84. Using a single light emitting element can lower power consumption. In other embodiments, a plurality of colored LEDs are used in the light source 82 to form white light. A light spreading element can include diffusing material (e.g., a volume diffuser containing particles, pigments, etc.) and light directing structures that facilitate transforming a received point source light, or numerous point sources, into a line light source. In some embodiments, the light coupler section 92 contains diffusing material and light directing structures so that light from the light source interacts with the diffusing material and light structures before the light enters the light guide 91.

Some embodiments include a reflector 93 positioned partially around the light coupler section 92 and the light source 82. Shown from an end view in FIG. 9A, the reflector 93 can be configured as a U-shaped or rectangular shaped structure. The reflector 93 can be positioned along a portion or the entire length of a light source 82 which runs along one edge of the display in the light coupler section 92. In some embodiments, the far end of the reflector 93 is closed to reflect light emitted from the coupler section 92 back into the light coupler section 92. The reflector can be placed in various locations and proximities with respect to the light coupler section 92 and the light source 82. In some embodiments, the reflector closely conforms to the surface of the light coupler section 92 and the light source 82. The reflector 93 can comprise suitable reflective metallic material, for example, aluminum or silver, or the reflector 93 can comprise a nonmetallic reflective material, films, or structures.

The reflector 93 can increase the coupling efficiency by redirecting light propagating out of the light coupler section 92 back into the light coupler section 92 for further interaction with the coupling microstructure. In one example, light from the light source 82 enters the light coupler section 92 and propagates to a diffraction grating disposed in the light coupler section 92. Some of the light is diffracted to the right (towards the display 84), and some of the light is diffracted to the left towards the reflector 93 as illustrated in FIG. 9A. A certain portion of light can travel straight through and exits the light coupler section 92. Light diffracted to the left in FIG. 9A (away from the display) may be reflected internally within the light guide 91 and remain therein, but some light may exit the light guide 91. The reflector 93 can be positioned to reflect light emitted from the light coupler section back towards the light coupler section 92 such that it re-enters the light guide 91 and propagates towards the display 84. The reflector 93 can be shaped to maximize the amount of light reflected back towards the light guide 91. For example, the reflector 93 can be "U"-shaped or parabolically shaped. A reflector 93 may be used in any of the embodiments described herein to increase the light coupling efficiency. In an embodiment, the surface of the reflector 93 is a specular reflector. In another embodiment, the reflector 93 comprises diffusely reflecting surfaces.

Figure 19A:
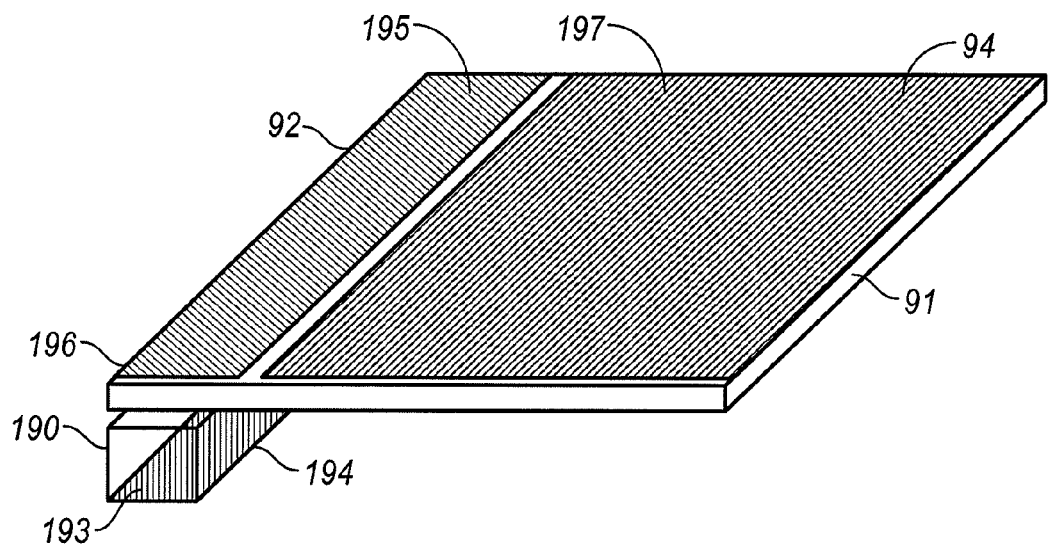
FIG. 19A is a schematic illustrating a refractive coupler that can be included in a light coupler section.
Figure 19B:
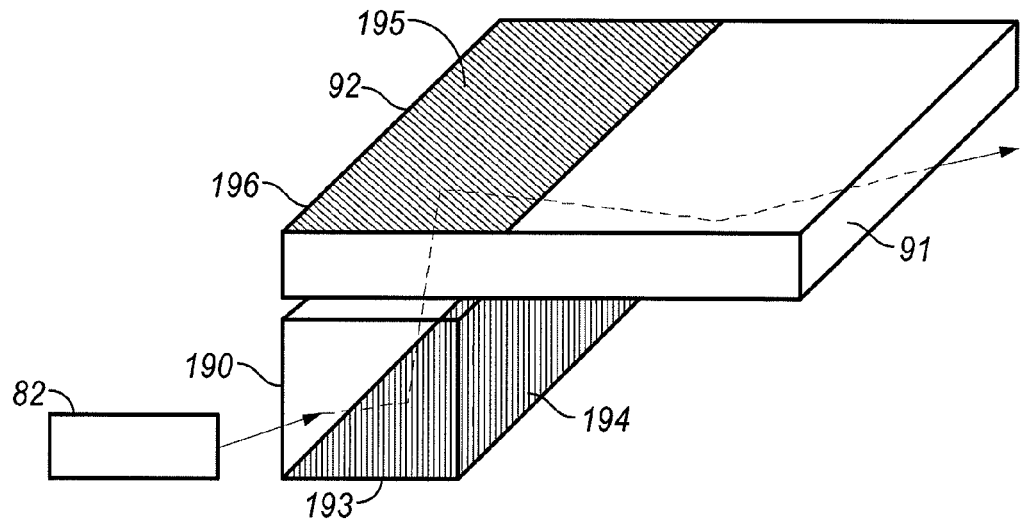
FIG. 19B is a schematic illustrating another view of the refractive coupler shown in FIG. 19A.
Figure 20:
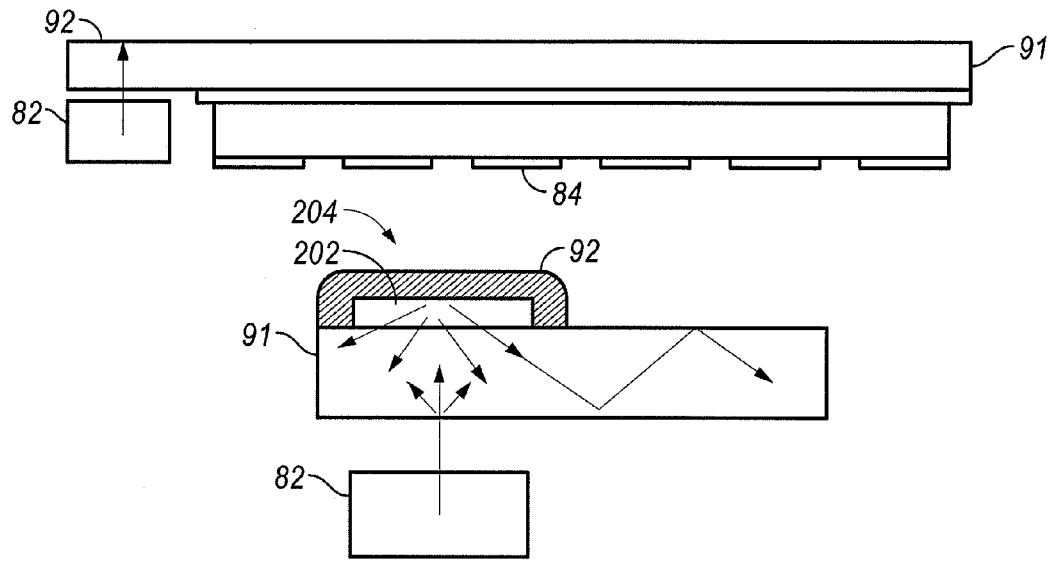
FIG. 20 is a schematic illustrating a light coupler section that uses light scattering or light absorption-reemission to couple light into the illumination section.
Figure 21:
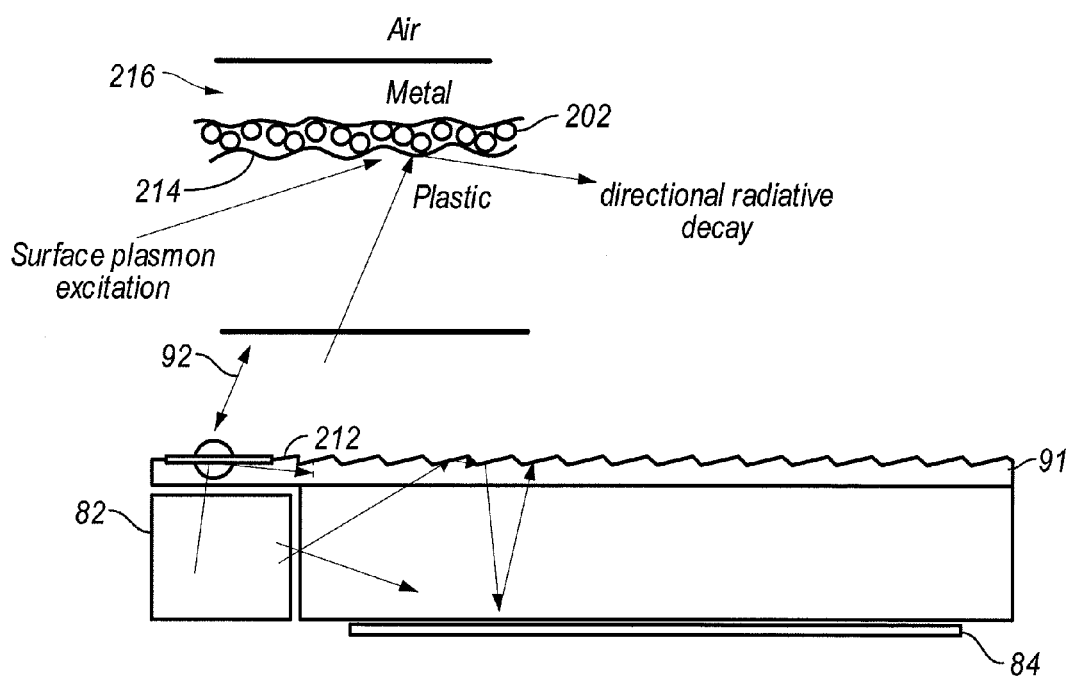
FIG. 21 is a schematic illustrating another embodiment of a light coupler section that uses light emission produced via surface plasmon excitation to couple light into the illumination film.

Illustrative surface coupling embodiments are described below in reference to FIGS. 10-21, and generally include reflective and transmissive surface diffractive gratings (FIGS. 10-13, 16-17), volume diffractive gratings (FIGS. 14-15, 18, 22, 23), prismatic devices (FIGS. 19A and 19B), and light scattering and/or light absorption and re-emission based devices (FIGS. 20-21). Such embodiments are sometimes generally referred to herein as "surface couplers," because light is coupled primarily through the top or bottom surface of the light guide 91 and not through the edge 83 of the light guide as shown in FIG. 8, or only minimally through the edge 83 in the presence of a reflector as shown in FIGS. 9A and 9B. The various illustrative embodiments illustrating coupling a light through the surface of a thin light guide can include using surface diffractive microstructures, surface diffractive reflectors, volume diffractive holographic recordings, prismatic microstructures, light scattering and/or emission-based elements to couple light from a light source 82 to an illuminator light guide 91 to provide a front light to a reflective display. In such embodiments, the light coupling section 92 can reside outside the viewable area of the display. The front illuminator light guide 91 can be manufactured such that both a light coupling section 92 and a light turning section 94 are created in the same step, e.g., via embossing a plastic film.

For ease of illustration, in the embodiments of couplers illustrated in FIGS. 10-15, only the light coupler portion 92 of the front illumination light guide 91 is shown. However, each embodiment can also include a light turning section 94 and a display 84 (FIG. 9A).

Referring now to FIG. 10, in some embodiments the light coupler section 92 includes a surface diffraction grating 102 configured on the proximal surface 104 of the light guide 91, e.g., the surface that is subsequently parallel to and adjacent to the light source. The surface diffraction grating 102 diffracts light from a light source 82 into the light guide 91. In FIG. 10 the surface diffraction grating 102 is used in a transmission mode so that light diffracts as it passes through the diffraction grating. The light is diffracted such that at least a portion of the diffracted light is directed into the light guide 91 at an angle where it propagates through the light guide 91 by total internal reflection (TIR).

The particular placement and orientation of the surface diffraction grating 102 can vary depending on, for instance, the particular implementation and manufacturing criteria. In some embodiments, the diffraction grating 102 is formed in a thin film of a light coupler section stack. In some embodiments, the surface diffraction grating 102 is embossed or etched on the proximal surface 104 of the light guide 91. The periodicity of the diffraction grating can be advantageously selected based on the wavelength of the received light to increase or maximize the light that is diffracted at an angle into the light guide 91 so that it propagates throughout the light guide 91 via TIR. Typically there are multiple periodicities in the diffraction grating so that many or all wavelengths of visible light are diffracted in useful directions. In some embodiments, the "diffraction grating" includes diffraction structures of different orientations and different periodicities so as to couple light incident at multiple angles onto the coupler section.

FIG. 11 illustrates another embodiment of a surface diffraction grating 112 used in a reflection diffraction mode. In this embodiment, the light source 82 provides light through a proximal (or near) surface 104 of the light coupler section 92. The light propagates to the surface diffraction grating 112 disposed on a distal surface 116 of the light guide 91. The diffraction grating 112 redirects the light in various directions inside the light guide 91. The directions depend on the periodicities of the diffraction grating, the wavelength and incidence direction of the received light from the light source 82. The diffraction grating 112 can be configured such that at least a portion of the reflected light propagates throughout the light guide by total internal reflection. In some embodiments, the periodicities of the diffraction grating 112 is selected in conjunction with the selection of the light source 82 so as to increase or optimize the portion of light reflected from the diffraction grating 112 at an angle advantageous for TIR within the light guide 91. In some embodiments, a coating 114 is placed on the distal side of the diffractive grating 112 to improve reflectivity. The coating 114 can be any suitable reflective coating including a metallic coating. In some embodiments, the reflective coating 114 comprises vapor deposited aluminum or silver. In some embodiments, the reflective coating can be formed from wet printed metallic ink (e.g., silver-nanoparticle based ink) or the like. In similar embodiments to those illustrated in FIGS. 10 and 11, the coupler region 92 can comprise a 2-D mosaic of 1D surface diffraction gratings (e.g., a 2-D arrangement of patches, or domains, each containing a 1D surface diffraction with varying periods and/or orientations) which allows the coupler to operate over multiple wavelengths, and for non-collimated input light sources.

FIGS. 12 and 13 illustrate embodiment of surface coupling using a blazed diffraction grating 122 on the near surface 104 and in the light coupler section 92 of a light guide 91. FIG. 12 illustrates the blazed diffraction grating 122 used in a transmission configuration, where FIG. 13 illustrates a blazed diffraction grating 132 used in a reflection configuration. A blazed diffraction grating can be an echelette (saw tooth) type of grating, wherein the grating is designed for maximum intensity at a desired region of the diffraction spectrum. The blazed diffraction grating improves the directionality of coupled light, directing light received from a light source 82 to propagate through the light guide 91 and to a display. In some embodiments, the blaze angle is selected in conjunction with the grating periodicity and with the light source 82 to determine the angle the received light is directed into the light guide 91.

FIG. 13 also illustrates an embodiment of a light coupler section 92 that includes a blazed surface diffraction grating 132. The blazed surface diffraction grating 132 couples light from a light source 82 to a thin light guide 91. In FIG. 13, the blazed diffraction grating 132 is configured as a surface diffraction grating in a reflection configuration, the blazed diffraction grating 132 being positioned on the far (or distal) surface 116 of the light guide 91. A light source 82 provides light to a near surface 104 of the light guide 91 and then to the blazed diffraction grating 132. The blazed diffraction grating 132 reflectively diffracts the light, a portion of which propagates through the light guide 91. The blazed surface provides an additional means to direct the reflected light into the light guide 91 so total internal reflection occurs, facilitating the light to propagate the display 84 (not shown). Here, and in FIG. 12, blazing the diffraction grating can provide better control over the diffraction direction which can lead to a higher efficiency coupling between the light source 82 and the thin light guide 91 resulting in more light propagating through the light guide 91 and reaching a display 84. Use of blazed diffraction gratings allows the selection of both a blaze angle and a diffraction grating periodicity, in conjunction with the selection of a light source, to increase or optimize the light coupled into the light guide 91.

Figure 14:
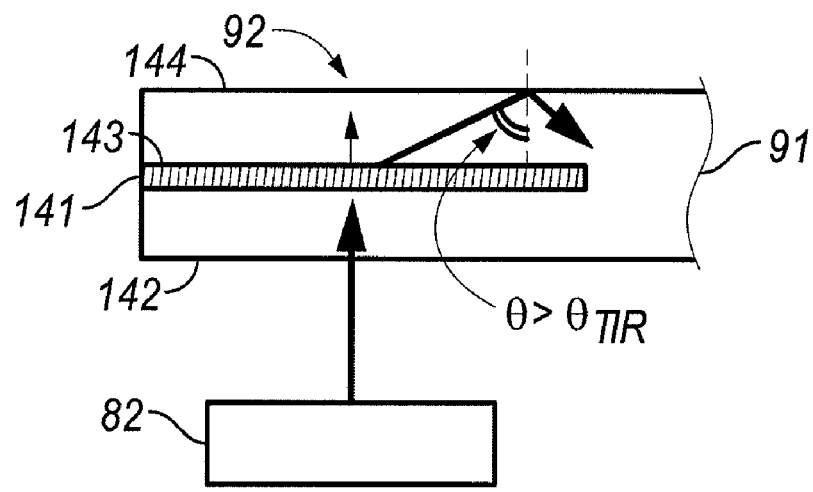
FIG. 14 is a schematic illustrating a transmissive volume diffraction grating in a light coupler section.
Figure 15:
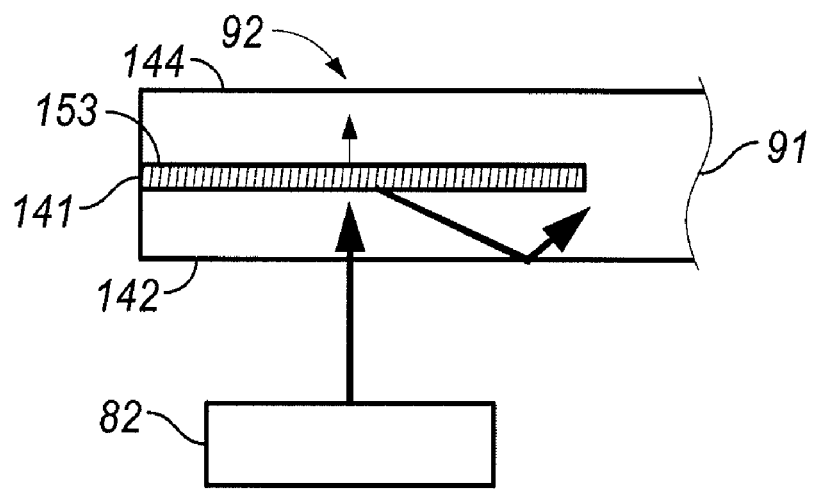
FIG. 15 is a schematic illustrating a reflective volume diffraction grating in a light coupler section.

FIGS. 14 and 15 illustrate light coupling embodiments that include a volume diffraction grating. Specifically, FIG. 14 illustrates a light coupler section 92 that includes a volume diffraction grating 143 employed in a transmission configuration. FIG. 15 illustrates a light coupler section 92 that includes a volume diffraction grating 153 employed in a reflection configuration. The volume diffraction gratings 143, 153 include a holographic recording medium 141 (e.g., a photosensitive gel, or photopolymer resin) sandwiched between two substrates or substrate portions 142, 144 and positioned within the light coupler section 92 of the light guide 91. In the transmission configuration shown in FIG. 14, light from the light source 82 passes through the volume diffraction grating 143 and diffracts at an angle such that at least a portion of the diffracted light propagates through the light guide 91 and to a display (not shown) by total internal reflection. In the reflection configuration shown in FIG. 15, light from the light source 82 reflectively diffracts from the volume diffraction grating 153 at an angle such that at least a portion of the reflected light propagates through the light guide 91 and to a display by total internal reflection.

In some embodiments, the volume diffraction gratings 143, 153 are volume phase holographic ("VPH") diffraction gratings. Instead of physical grooves, the VPH diffraction gratings use a periodic modulation of the refractive index within the holographic recording medium 141. Using a volume holographic diffraction grating eliminates much of the surface contamination sensitivity typically seen in other surface diffraction gratings, and enables a facile control over the directionality of the light coupled into the light guide section of the device. The control over the directionality is achieved during the recording stage of the hologram by employing appropriately oriented beams and multiple recordings.

Figure 22:
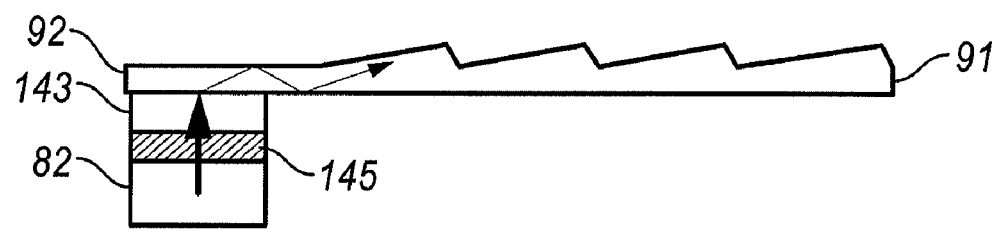
FIG. 22 is a schematic illustrating an embodiment of a transmission hologram volume diffraction grating used in the light coupler region.

FIG. 22 is a schematic illustrating an embodiment of a transmission hologram volume diffraction grating 143, such as the volume grating illustrated in FIG. 14. The transmission volume diffraction grating 143 can be formed on the surface of the light coupler section 92 proximal to the light source 82. The light source 82 and the volume diffraction grating 143 are positioned such that at least a portion of light emitted by the light source 82 to the diffraction grating 143 is diffracted into the light guide 91. The hologram volume diffraction grating 143 may comprise a single layer or multiple layers. A multiple layer "stack" embodiment may comprise a base film carrying the photosensitive material. The stack can also comprise an adhesive which is used to laminate the hologram diffraction grating onto a surface, e.g., the light coupler section 92 of the light guide 91. This embodiment can include an optional layer 145 formed between the light source 82 and the transmission volume diffraction grating 153. The layer 145 may comprise air or an optically matched adhesive layer (e.g., a pressure sensitive adhesive) that couples the light source with the hologram. Some embodiments may not include layer 145, for example, where light source 82 is directly in contact with the hologram diffraction grating 153 or the hologram itself could be formed in an adhesive type of holographic recording material.

Figure 23:
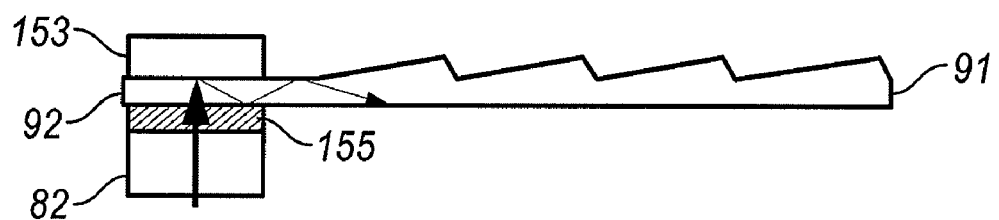
FIG. 23 is a schematic illustrating an embodiment of a reflection hologram volume diffraction grating used in the light coupler region.

FIG. 23 is a schematic illustrating an embodiment of a reflection hologram volume diffraction grating 153, such as the volume diffraction grating 153 illustrated in FIG. 15. The reflection volume diffraction grating 153 can formed on the top surface of the light coupler section 92. In some embodiments, a reflector (for example, reflector 93 illustrated in FIG. 9) may be positioned around the volume diffraction grating 153, the light source 82, and the light coupler section 92 to recycle light and increase the total efficiency of coupling light from source to light guide. In some embodiments, another optional layer 145 (discussed above in reference to FIG. 22) may be formed between the light source 82 and the light guide 91.

Figure 16A:
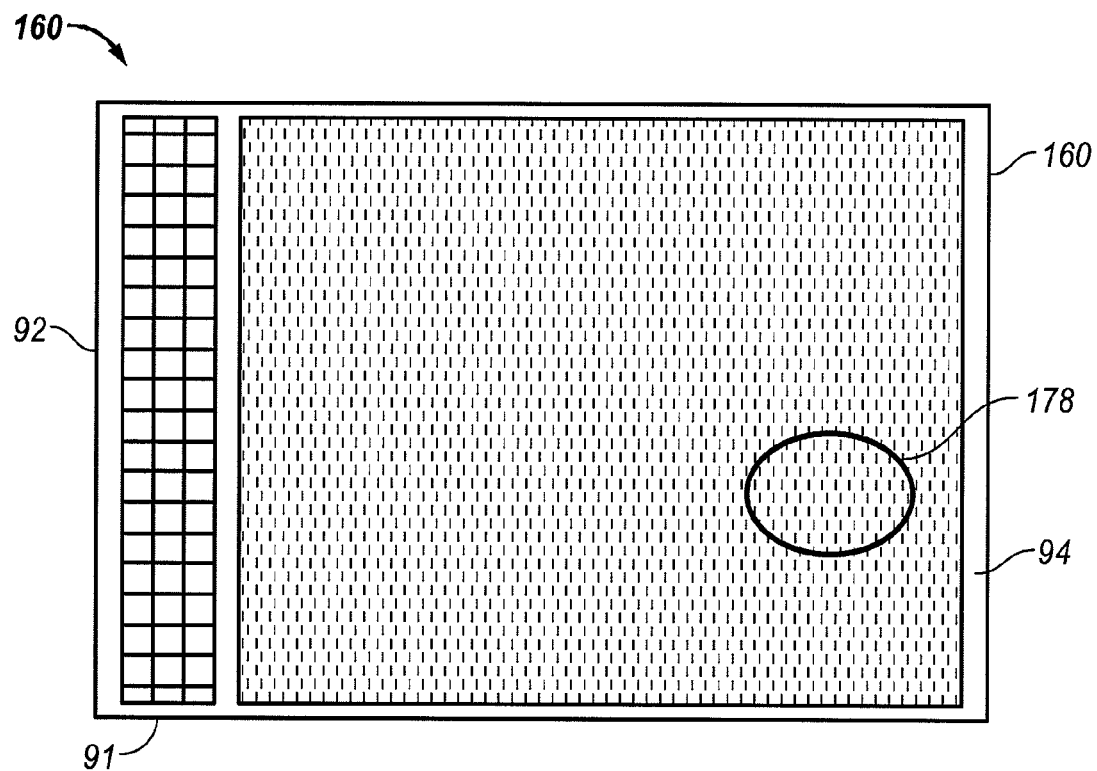
FIG. 16A is a schematic illustrating a top view of an illumination device with both a surface coupling section and a light turning section.
Figure 16B:
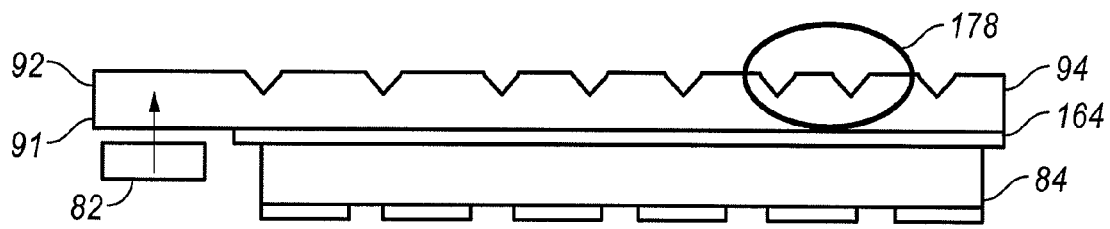
FIG. 16B is a schematic illustrating a side view of the illumination device with both a surface coupling section and a light turning section illustrated in FIG. 16A.
Figure 17:
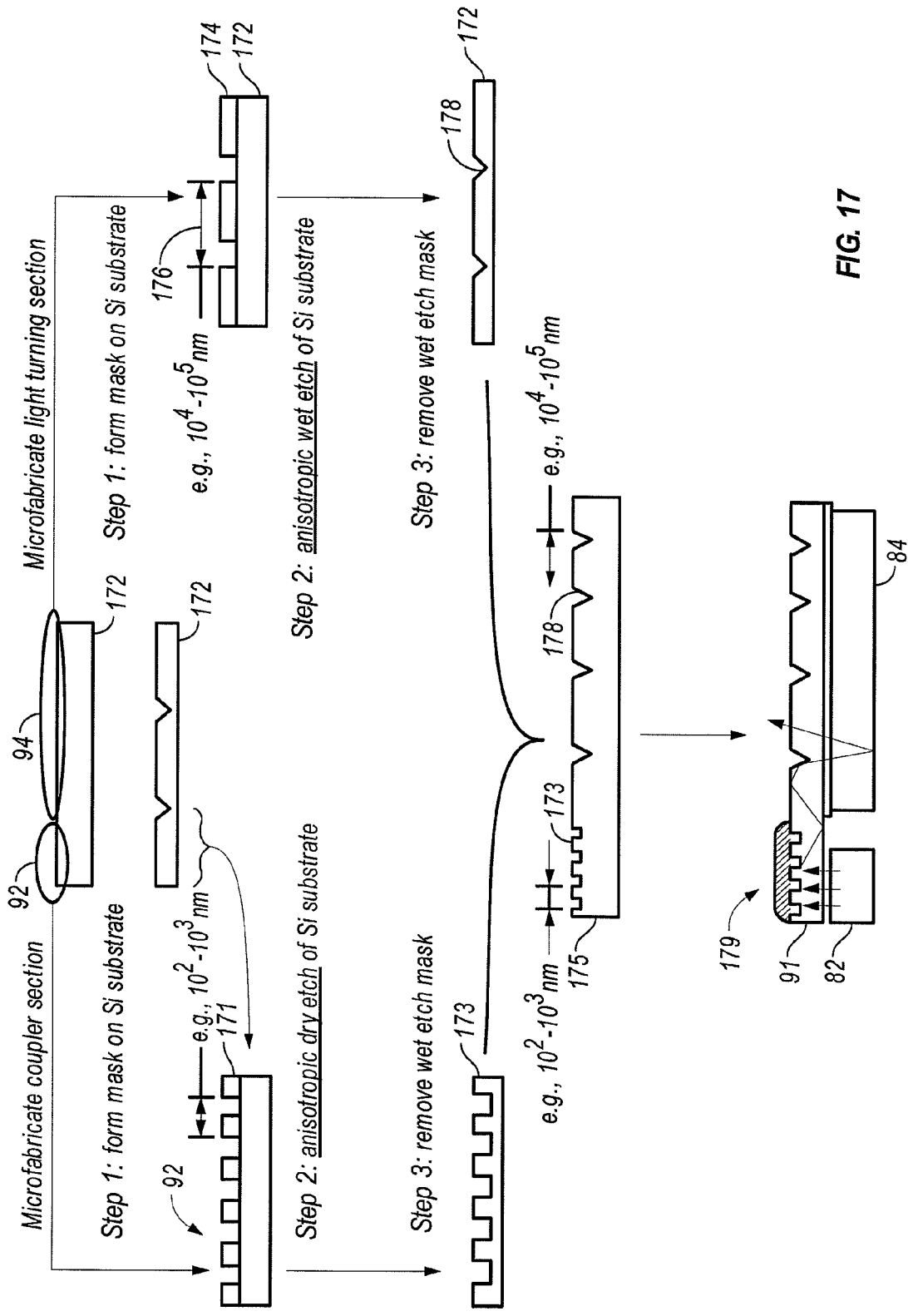
FIG. 17 illustrates a process of making the illumination device illustrated in FIG. 16.
Figure 18:
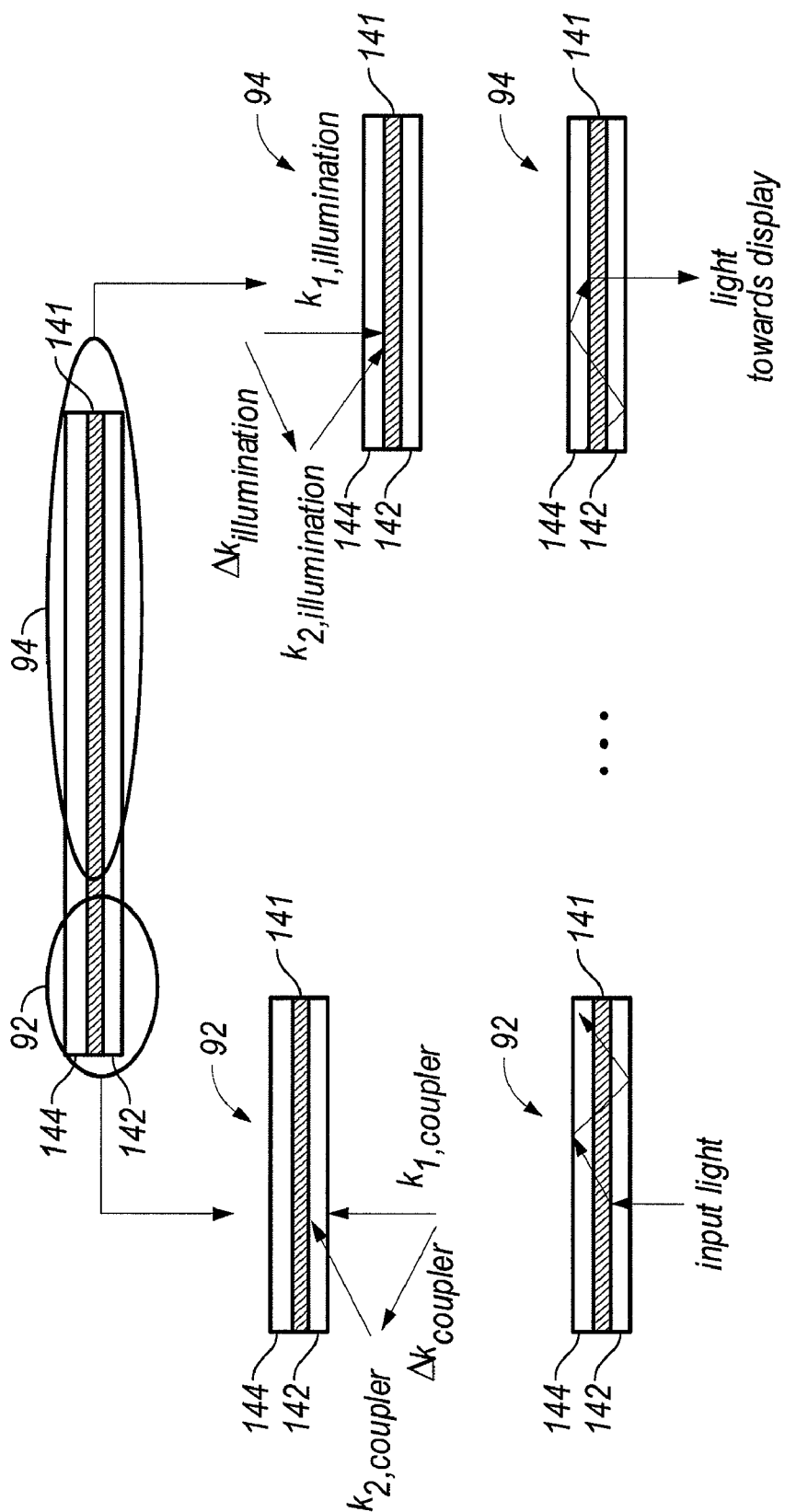
FIG. 18 illustrates a process for recording a volume diffraction grating, such as the volume diffraction grating illustrated in FIG. 14.

FIGS. 16A, 16B, 17 and 18 illustrate examples of design and fabrication processes for diffractive couplers. Specifically, FIGS. 16A, 16B and 17 illustrate forming a reflection surface diffraction grating, such as illustrated in FIG. 11. FIG. 18 illustrates forming a volume diffraction grating illustrated, such as is illustrated in FIG. 14. These and similar fabrication techniques can also be used to form other diffraction couplers. Of course, it is appreciated that other suitable fabrication techniques and processes can also be used to form such gratings.

FIGS. 16A and 16B illustrate a top view and a side view, respectively, of one embodiment of a display device 160 having a reflective diffractive coupler 92. Referring to FIGS. 16A and 16B, the display device 160 includes a light guide 91 with a light coupling section 92. The light guide 91 includes a light turning section 94 with prismatic structures 178 disposed on the surface distal to the display 84. A light source 82 is positioned to provide light to the light coupling section 92. The structures 178 on the light turning section 94 re-direct light provided by the light source 82 propagating through the light guide 91 towards the display 84. Such structures can include reflective surfaces (e.g., prismatic grooves) disposed in various patterns including lines, concentric circles, on curvilinear paths, or elliptical paths. In this embodiment, a diffuser layer 164 is positioned between the illumination light guide 91 and an interferometric modulator display 84. The diffuser layer 164 is specifically selected for the specularly reflecting interferometric modulator display 84; other displays may have other additional layers or not have a diffuser layer. Also, certain additional layers and components can be included in the embodiment illustrated here that are not shown in these particular figures.

FIG. 17 shows an exemplary process of making the diffractive coupler illustrated in FIG. 16. This process involves two paths, one for making the light turning section 94 (illustrated on the right side of FIG. 17) and another for making the coupler section 92 (illustrated on the left side of FIG. 17). As illustrated in FIG. 17, the fabrication begins with a substrate (or blank) 172, and the process follows the two paths to form the coupler section 92 and the light turning section 94. The substrate 172 preferably comprises crystalline silicon although other suitable materials can also be used.

Referring first to the fabrication of the light turning section 94 as illustrated on the right side of FIG. 17, at Step 1 a mask is placed on the substrate 172 in a desired pattern to form light turning features. In one embodiment, a mask 174 is formed in by lithographically patterning a hard mask 174 onto the substrate 172. The mask 174 can comprise $SiO_2$, $Si_3N_4$ or the like. The average spacing (period) 176 of the mask pattern can vary with particular implementations and affects the resulting light turning features 178 formed from the mask 174. The size or shape of the light turning features 178 may vary as a function of the distance from the light coupler section 92 in order to provide uniform illumination of the display 84. Functionally, the light turning features 178 operate like small light sources each illuminating a small area of the display 84. If the illuminated areas sufficiently overlap then the display appears evenly illuminated. In an illustrative embodiment a mask line can be patterned about every $10^4$-$10^6$ nm, preferably about every $10^4$-$10^5$ nm, so as to produce light turning features separated by this distance. The periodicity of the pattern can be constant, non-uniform or random, or it can decrease as a function of distance from the coupling section 92.

Still referring to the right-hand side of FIG. 17, at Step 2, an anisotropic wet etch is performed on the substrate 172, etching into the substrate 172 to form the light turning features 178. The light turning features 178 can be grooves of various shapes or sizes formed in lines, circles or other patterns that are suitable for redirecting light propagating through the light turning section 94 to the display 84 so that visible portions of the display 84 are evenly illuminated. Such grooves can be evenly spaced. Alternatively, the spacing can decrease as distance from the coupler section 92 increases so that more light turning features 178 are formed in the portion of the light turning section 94 farther from the coupler section 92. Also, the size of the light turning features 178 can increase as distance from the coupler section increases.

The solution used for the wet etch of a crystalline silicon substrate can comprise $KOH:H_2O:IPA$, a 25% solution of TMAH, or another suitable wet etchant, used at an appropriate temperature, e.g., between 25-90° C., preferably about 80° C. Finally, at Step 3 the wet etch mask 174 is removed from the substrate 172 using, for example, HF (wet) for a mask comprising $SiO_2$. After the light turning section 94 is etched into the substrate 172, the coupler section 92 can be fabricated while the light turning section 94 is protected, for example, by a temporary coating layer. The steps of the fabrication process can be performed in a different order, e.g., where the coupler section 92 is first etched into the substrate and then the light turning section 94 is formed. The process steps can also be intermixed.

The left side of FIG. 17 illustrates an embodiment of the coupler section 92 fabrication process. At Step 1 the process lithographically patterns an etch mask 171 onto the substrate 172. The periodicity and structure of the mask pattern is set to form surface relief features that will determine the diffraction response. Because diffraction of light is based on its wavelength, the wavelength of the light source may be used to determine a suitable periodicity to diffract a relatively large portion of the light into the light guide 91 so that it propagates to the display 84. The periodicity of the pattern can be consistent along the length of the light guide 91 from the edge of the light guide 91 nearest the light coupler section 92 to the edge farthest from the light coupler section 92, or it can vary. Examples of mask material include photoresist, organic bottom antireflection layer (BARL), and $SiO_2$ for a Si substrate. At Step 2 an anisotropic dry etch is performed on the substrate 172 to etch the substrate 172 and form a diffraction grating 173. In some embodiments, the dry etching is done with reactive ion etching using $CF_4$ gas at low pressure ($CF_4$-RIE). At Step 3, the dry etch mask 171 is removed using, for example, $O_2$-plasma for an organic mask, or HF wet etching for an $SiO_2$ mask, leaving the surface diffraction grating 173.

The resulting etched substrate 175 includes microstructures that can be used to couple light into a thin light guide 91 and turn light propagating through the thin light guide to a display. The etched substrate 175 is a "positive" shape (the desired shape of the light guide) which can be used to make a negative replica. In some embodiments, the negative replica can be an electroformed metal foil which is then used for embossing illumination film, e.g., to form an illumination device 179 having a light guide 91 embossed with both the reflective surface diffraction grating and the light turning section. In some embodiments, the negative replica can be a mold, which is then used for injection molding processes.

The process illustrated in FIG. 17 can also be used to form separate "master molds," one mold having the coupler section 92 and another mold having the light turning section 94. Two portions of metal foil can be used to make separate negative replicas of each of the two master molds. In some embodiments, the two portions of metal foils can be joined to form a single negative replica, such that the stitch line falls outside the area of the device that will overlap with the viewing area of a display. The joined negative replica can then be replicated twice (such that the first replication produces a similar but inverted surface structure, and the second replication produces the original surface structure), and the second replication can then be used to make a mechanically robust metal electroform for embossing illumination film with the coupler section structures and the light turning section structures.

FIG. 18 illustrates a process for recording a transmission mode volume diffraction grating, such as the volume diffraction grating illustrated in FIG. 14. In FIG. 18, both the coupler section 92 (illustrated on the left side of FIG. 18) and the light turning section 94 (illustrated on the right side of FIG. 18), are based on volume holograms. The orientation of the corresponding recording beams for each of the two sections is denoted by the wave vectors $K_1$ and $K_2$, and the recorded (holographic) fringe periodicity direction is given by the difference vector, $\Delta K$.

As illustrated in FIG. 18, a holographic recording material 141 is optionally sandwiched between two substrates 142, 144. In some embodiments, either one of the substrates 142, 144 can be may not be present during recording, instead included after the holographic recording is made. The holographic recording material 141 can be a gel, a solid film, a light sensitive photopolymer resin, or the like. In some embodiments, the holographic recording material has adhesive properties, or is a film comprising an adhesive, such that the recording material can be placed on one side of a substrate and a light guide film can be applied to cover the recording material, creating a film stack. Other configurations are also possible. The left-side of FIG. 18 shows the formation of the coupler section which is done, for example, while protecting (masking) the rest of the light sensitive film, including the light turning section 94. The right-side of FIG. 18 shows the formation of the light turning section, which is also done, for example, while protecting the light coupler section of the film. In practice, the tilted beams $K_2$ will be coupled via a prism index matched to the holographic material (so that light enters from air at normal incidence onto the prism surface), and the back of the film will be index matched to a bulk material as to prevent reflections from the back surface, which would create an unwanted set of holographic fringes in the reverse direction. In some embodiments, at least one of the recording beams will have an appropriately chosen divergence or convergence angle, such that the recorded hologram will be able to act upon a diverging light source.

As shown in FIG. 18, the light turning section 94 uses the volume diffraction grating to redirect light propagating through the light turning section 94 towards a display. In some embodiments, the volume diffraction grating is the only light directing feature used. In other embodiments, the volume diffraction grating can be combined with other light directing features (e.g., prismatic features, reflectors, surface diffraction features, and the like) to direct light more efficiently to a display.

FIGS. 19A and 19B illustrate an exemplary embodiment of a light guide 91 that includes a light coupler section 92 comprising a prismatic lightbar-like coupler 190. FIG. 19B shows the same embodiment as FIG. 19A with a magnified view and illustrating light propagating through the prismatic coupler 190. Referring to FIGS. 19A and 19B, the light guide 91 has two sections—the light turning (illumination) section 94 which contains facets 197 predominantly parallel to a longitudinal direction along the length of the light bar 190, and the light coupler section 92 having facets 195 oriented at +45° from the longitudinal direction of the light bar. A light source 82 provides light into one end of a light bar 190 disposed along a coupler section 92. The light bar 190 and the coupler section 92 each include V-shaped prismatic grooves 193, 195 placed at a +45 and/or −45° orientation relative to the longitudinal direction of the light bar 190. The V-grooves 193, 195 are disposed on the lower surface 194 of the light bar 190, and on the upper surface 196 of the coupler section 92, and comprise sloping or angled surfaces that reflect light (e.g., via total internal reflection) provided by the light source 82 from the light bar 190 and into the coupler section 92. The V-grooves 195 in the coupler section 92 reflect the light from the light bar 190 into the light turning section 94. The light turning section 94 contains facets 197 that reflect light propagating through the light turning section 94 towards a display (not shown). In various implementations, the facets 197 can comprise a variety of structures having different shapes and orientations that can re-direct light propagating through the light turning section 94 towards a display.

The light bar 190 can be fabricated via injection molding in a cavity having a mold insert on one side containing the inverse surface microstructure of the V-shaped prismatic grooves 193. In one example, a V-grooved insert for the injection molding cavity can be fabricated by single-point diamond turning a set of parallel grooves, and then cutting a rectangular portion of the shim oriented at 45° from the groove direction. The fabrication of such a light guide 91 can be also be done by single point diamond tooling the two sections separately and joining the resulting sections into a single master shim, which is copied by electroforming to form a seamless master molding structure from which the light guide 91 can be formed. A second approach involves creating the V-grooves by anisotropic wet etching of silicon, followed by cutting at 45° and polishing the coupler section or simply cutting the illumination section. The well controlled thickness of silicon wafers greatly simplifies the step where the two sections are joined—the width of the seam region will be smaller than 1 mm, which will be found outside the viewing area of the display. In some embodiments, a reflector (for example, reflector 93 illustrated in FIG. 9) can be positioned around the light bar/light coupler section to direct any (or at least a portion of) stray light that has been emitted from the light guide 91 and/or the light bar 190 into the surrounding area back into the light guide 91 and/or light bar 190.

FIG. 20 illustrates an exemplary embodiment that uses light emitting material to couple light into an illumination light guide 91. In this embodiment, the coupler section 92 includes a light emitting material that emits light when it is pumped by an external source. In this example, a light source 82 can be used to pump (excite) a photoluminescent material 202. Emissions from the photoluminescent material 202 propagate along the light guide to the illumination region. The light emitting material can be disposed within the light coupling section 92 of the light guide 91, or on a front surface (as illustrated in FIG. 20), a back surface, or a side surface of the light guide 91 and disposed to receive light entering the light guide 91 from the light source 82. In some embodiments, light emitting material comprises particles capable of both light emission and light scattering.

In some embodiments, a reflector 204 can be placed on top of the photoluminescent material 202 to enhance the efficiency. The reflector 204 can comprise, for example, reflecting tape, metallic films, dielectric multilayers such as 3M's enhanced specular reflector, ESR, film, interference coatings, or other types of reflectors. The surface of the reflector 204 adjacent to the photoluminescent material 202 can be coated with white paint or another highly reflective material. The photoluminescent material 202 can be selected to match the light source 82 emitted light spectrum so as to absorb the light efficiently. The photoluminescent material 202 can comprise a light diffusing material and or light scattering material. In one example, the light source 82 is a UV, and the photoluminescent material 202 absorbs UV light and re-emits visible light in substantially all directions. A shaped metal reflector 204 can also increase the coupling efficiency to the illumination section of the light guide by sending at least a portion of the visible light emitting to the wrong directions into the illumination section.

In one embodiment, a blue-LED similar to those used for white-LEDs can be paired with a light emitting phosphor similar to those used to produce white light in white-LEDs. A UV-LED allows an even wider choice of photoluminescent materials (not only the same phosphors as those used in white-LED, but also mixtures of organic light emitting dyes or mixtures of inorganic quantum dots which allow an even finer control over the spectral composition of the final white light that is trapped in the film and guided towards the light emitting region). In terms of fabrication, this could be as simple as screen printing a "line" or a "pad" of phosphor in the coupler region of a front light film, followed by lamination of a reflecting tape that covers the printed material (compatible with roll-to-roll processing, and thus implementable downstream from the embossing of the illumination section into a plastic film).

In various embodiments, the light emitting material 202 comprises a photoluminescent reflecting phosphor material, which can be pumped, for example, by either a blue-LED light source 82 directly or via an LED light bar assembly. Longer wavelength spectral components (e.g., green, red, etc.) are emitted by the phosphor and, when combined with the blue pump light, produce the spectrum of the white light. Both the longer wavelength emission and the shorter wavelength (e.g., blue) pump light are propagated along the light guide 91. The proportion of the different spectral components may be controlled to obtain the desired white light. To provide the correct proportion as to form "white" light, the phosphor may be diffusely reflecting so that the blue-light is reflected into a diffuse cone adjusted such that the intensity matches the cone of light emission from the excited phosphor. Part of the light from each of these cones is guided by the light guide 91. It is appreciated that other techniques can also be used to obtain the desired white light. In another embodiment, the light source 82 emits white light, and the material 202 is a simple diffuse reflecting material which is able to redirect a portion of the incoming light into the light guide 91. In this embodiment, a reflector 204 is preferred to be used for increasing the coupling efficiency into the light guide.

FIG. 21 illustrates another embodiment of a light emission coupler based on surface plasmon resonances. This coupler section 92 comprises a thin corrugated metal film forming a diffraction grating 214 on a surface 212 of the light guide 91. Light emissive material 202 is disposed on the diffraction grating 212, and a metal film 216 is disposed thereon. For example, the light coupler section 92 may be formed in a light guide 91 comprising plastic by embossing the periodic surface relief structure 214 on the surface 212 distal to the light source 82 (to essentially form a diffraction grating), depositing the light emitting material 202 (e.g., luminescent or fluorescent molecules (e.g., laser dyes), or quantum dots) thereon, and conformally depositing a metal reflector 216 on top of the light emitting material 202. Preferably, the metal reflector 216 is a highly reflective material such as silver or aluminum. The light source 82 (e.g., a light bar) is used to excite the light emitting material 202, which transfer the energy to surface plasmon modes due to the physical proximity to the thin metallic film of the reflector 216. These surface plasmon modes radiate light directionally due to the periodicity of the metallic film structure (or corrugation). Accordingly, the emissive material couple energy into plasmons in the metal film. The plasmons couple energy into optical emission through the periodic structure, which can be adjusted to control the direction and wavelength of optical output.

In order to allow white light operation, the light emitting species can be chosen so as to emit across the entire visible spectrum (e.g., mixture of red, green, and blue emitters). The periodic surface relief structure may comprise a 2D mosaic containing "patches" with different periodicity and orientations such that the desired white light will be produced on average along the directions into which light is trapped by total internal reflection inside the light guide 91.

A wide variety of variation is possible. Films, layers, components, and/or elements may be added, removed, or rearranged. Additionally, processing steps may be added, removed, or reordered. Also, although the terms film and layer have been used herein, such terms as used herein include film stacks and multilayers. Such film stacks and multilayers may be adhered to other structures using adhesive or may be formed on other structures using deposition or in other manners.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples.

What is claimed is:

1. An illumination device comprising:
    a light guide including:
        a front surface exposed to ambient light;
        a back surface;
        a light coupling section including a diffraction grating, said light coupling section disposed at least partially between said front surface and said back surface, said light coupling section configured to receive optical energy through said back surface at an angle about normal to said back surface, said diffraction grating configured to direct light through said light guide; and
        a light turning section configured to redirect at least a portion of the light received from said light coupling section out of said back surface, said redirected light being emitted from said back surface at an angle about normal to said back surface; and
    a light source disposed to provide optical energy to said back surface of said light coupling section at an angle about normal to said back surface,
    wherein said light guide is a film stack or said light guide has a film applied directly thereto.
2. The device of claim 1, wherein said light source is disposed adjacent to said back surface of the said light coupling section.
3. The device of claim 1, wherein said diffraction grating includes surface diffractive features.
4. The device of claim 1, wherein said diffraction grating includes volume diffractive features.
5. The device of claim 1, wherein said diffraction grating is disposed on said front surface.
6. The device of claim 1, wherein said diffraction grating is disposed on said back surface.
7. The device of claim 1, wherein said diffraction grating is a transmissive diffraction grating.
8. The device of claim 1, wherein said diffraction grating is a reflective diffraction grating.
9. The device of claim 1, wherein said diffraction grating includes a blazed grating.
10. The device of claim 1, wherein said light coupling section further includes a light emissive material and a metal surface disposed adjacent to said light emissive material, said coupling section configured such that surface plasmon excitation occurs in said metal surface when said light emissive material is illuminated with said optical energy.
11. The device of claim 1, wherein said light turning section includes a plurality of turning features disposed on said front surface of the light guide.
12. The device of claim 1, wherein said light turning section includes a plurality of turning features disposed on said back surface of the light guide.
13. The device of claim 1, wherein said light turning section includes a plurality of turning features within said light guide.
14. The device of claim 1, wherein said light turning section includes prismatic features configured to direct light out of the back surface of the light guide.
15. The device of claim 1, further comprising a reflector disposed adjacent to the light coupling section to reflect at least a portion of light emitted from said light coupling section back into said light coupling section.
16. The device of claim 1, further comprising a display disposed substantially parallel to said back surface and adjacent to at least a portion of said light turning section.
17. The device of claim 16, wherein said display includes a plurality of interferometric modulators.
18. The device of claim 16, further comprising:
    a processor that is configured to communicate with said display, said processor being configured to process image data; and
    a memory device that is configured to communicate with said processor.
19. The device of claim 18, further comprising a driver circuit configured to send at least one signal to said display.
20. The device of claim 19, further comprising a controller configured to send at least a section of the image data to said driver circuit.
21. The device of claim 18, further comprising an image source module configured to send said image data to said processor.
22. The device of claim 21, wherein the image source module includes at least one of a receiver, transceiver, and transmitter.
23. The device of claim 18, further comprising an input device configured to receive input data and to communicate said input data to said processor.
24. The device of claim 1, wherein said light coupling section is configured to direct at least a portion of said light through said light guide via total internal reflection.
25. The device of claim 1, further comprising a reflector disposed with respect to said light coupling section so as to reflect at least a portion of light emitted from said light coupling section back into said light coupling section.

26. The device of claim 1, further comprising a display disposed substantially parallel to said back surface and disposed with respect to at least a portion of said light turning section so as to receive at least some of said redirected light.

27. The device of claim 1, wherein said diffraction grating is embossed or etched on said light guide.

28. The device of claim 1, wherein said light turning section includes a plurality of turning features that are embossed or etched on said light guide.

29. The device of claim 1, wherein the film stack or the film includes an adhesive.

30. The device of claim 1, wherein the light source has a width that is greater than a thickness of the light coupling section of the light guide.

31. An illumination device comprising:
  means for guiding light, said light guiding means having a front surface disposed towards ambient light and a back surface, said light guiding means including:
    means for coupling optical energy, disposed at least partially between said front surface and said back surface, and configured to receive optical energy through said back surface at an angle about normal to said back surface, said coupling means including a diffraction grating configured to direct light through said light guiding means; and
    means for turning light to redirect at least a portion of the light received from said coupling means out of said back surface, said redirected light being emitted from said back surface at an angle about normal to said back surface; and
  means for providing optical energy to said coupling means by illuminating said back surface with optical energy at an angle about normal to said back surface,
  wherein said light guiding means is a film stack or said light guiding means has a film applied directly thereto.

32. The device of claim 31, wherein said coupling means is configured to direct at least a portion of said light through said light guiding means via total internal reflection.

33. The device of claim 31, further comprising means for modulating light, said light modulating means disposed substantially parallel to said back surface and disposed with respect to at least a portion of said light turning means so as to receive at least some of said redirected light.

34. The device of claim 33, wherein said modulating means includes a reflective spatial light modulator.

35. The device of claim 34, wherein said reflective spatial light modulator includes a plurality of interferometric modulators.

36. The device of claim 31, wherein said light guiding means includes a light guide.

37. The device of claim 31, wherein said optical energy coupling means includes a light coupler section.

38. The device of claim 31, wherein said light turning means includes a light turning section including a plurality of turning features disposed on said front surface of said light guiding means.

39. The device of claim 38, wherein said plurality of turning features includes a plurality of prismatic features configured to direct light out of the back surface of said light guiding means.

40. The device of claim 31, further comprising means for reflecting light, said light reflecting means disposed with respect to said coupling means to reflect at least a portion of light emitted from said coupling means back into said coupling means.

41. The device of claim 1, wherein said diffraction grating is disposed on a surface of said light coupling section.

42. The device of claim 1, wherein said diffraction grating is disposed inside said light coupling section.

43. The device of claim 31, wherein said diffraction grating is disposed on a surface of said coupling means.

44. The device of claim 31, wherein said diffraction grating is disposed inside said coupling means.

45. The device of claim 31, wherein said diffraction grating is embossed or etched on said light guide.

46. The device of claim 31, wherein said light turning means includes a light turning section comprising a plurality of turning features that are embossed or etched on said light guiding means.

47. The device of claim 31, wherein the film stack or the film includes an adhesive.

48. The device of claim 31, wherein the optical energy providing means has a width that is greater than a thickness of the optical energy coupling means of the light guiding means.

* * * * *